Jan. 11, 1955     A. R. MOSLER     2,699,372
DEPOSITING MACHINE
Filed March 14, 1952     18 Sheets-Sheet 1
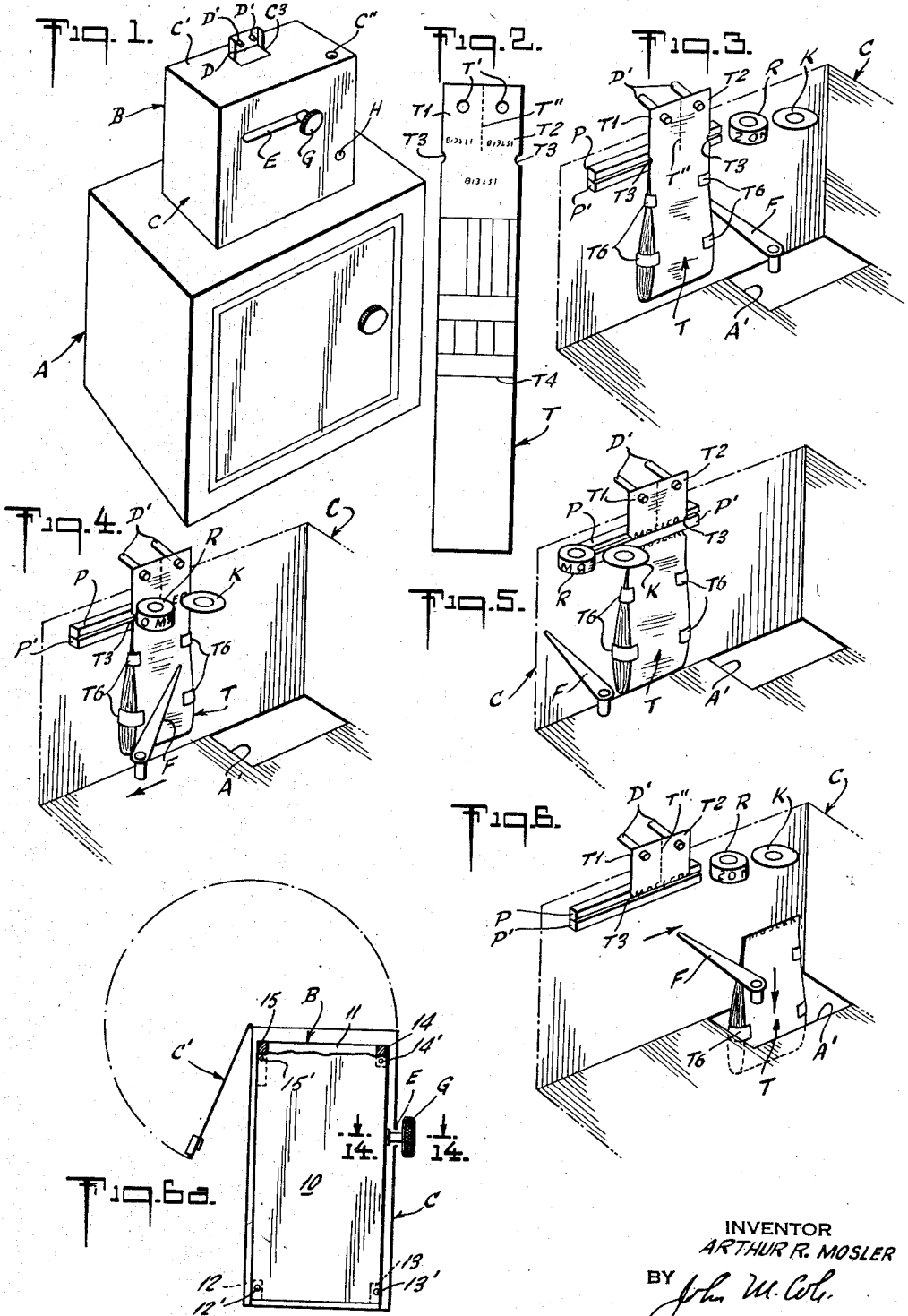
INVENTOR
ARTHUR R. MOSLER
BY
ATTORNEY Jan. 11, 1955  A. R. MOSLER  2,699,372
DEPOSITING MACHINE
Filed March 14, 1952  18 Sheets-Sheet 2
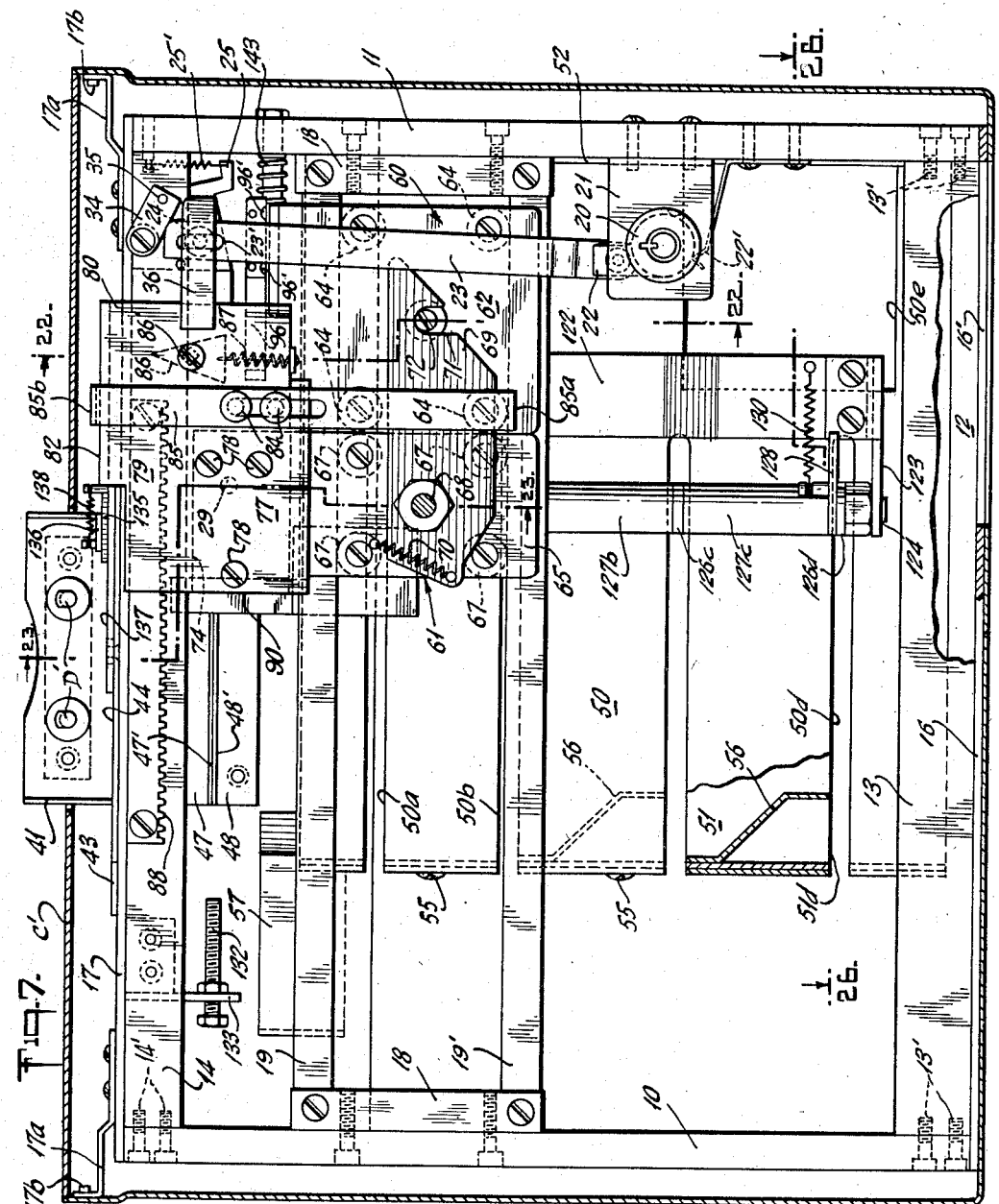
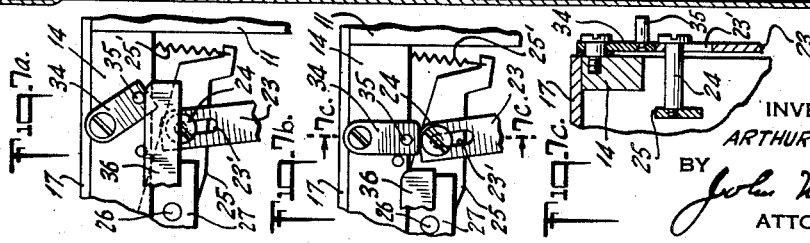
INVENTOR
ARTHUR R. MOSLER
BY
ATTORNEY

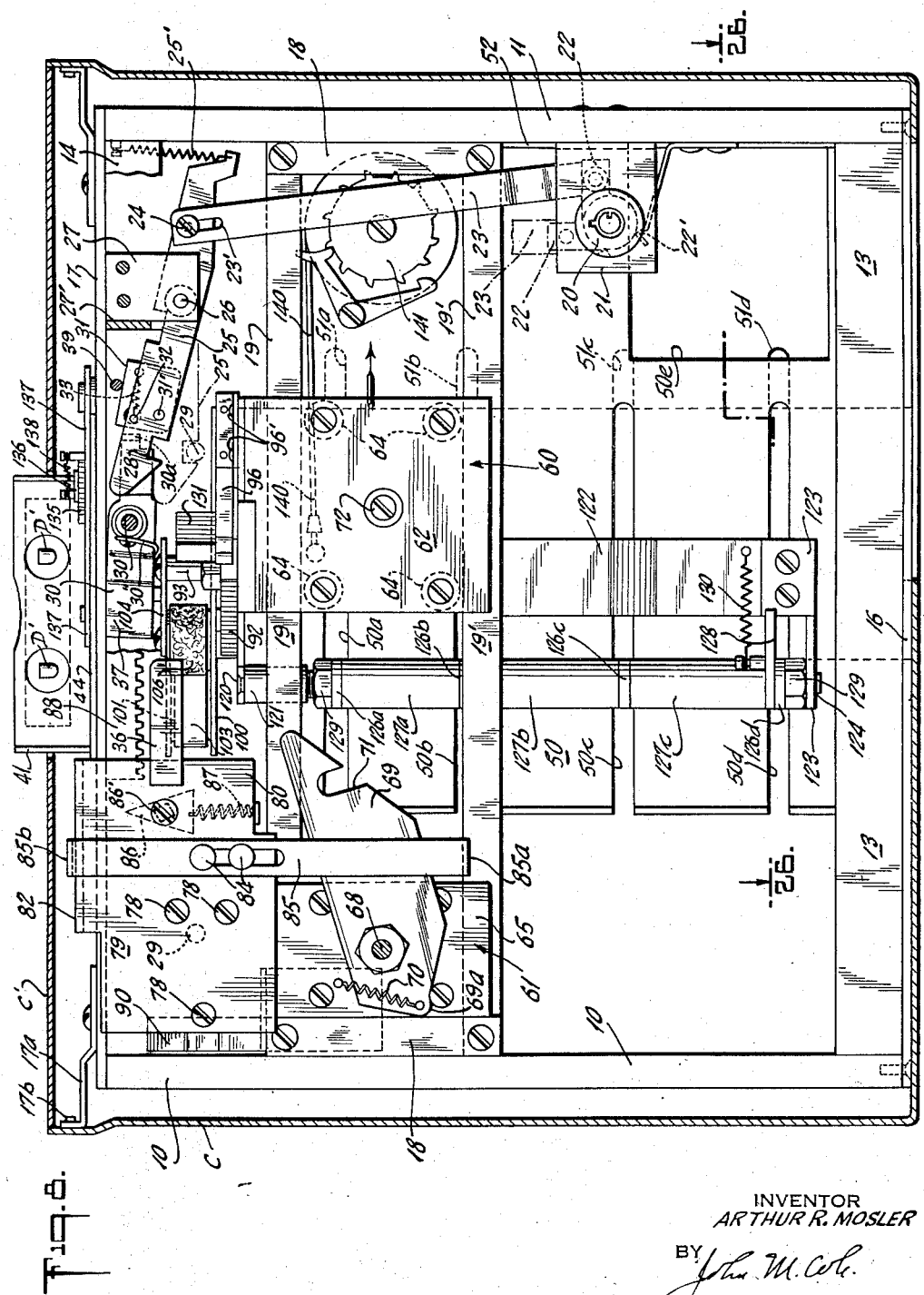

Jan. 11, 1955  A. R. MOSLER  2,699,372
DEPOSITING MACHINE
Filed March 14, 1952  18 Sheets-Sheet 4
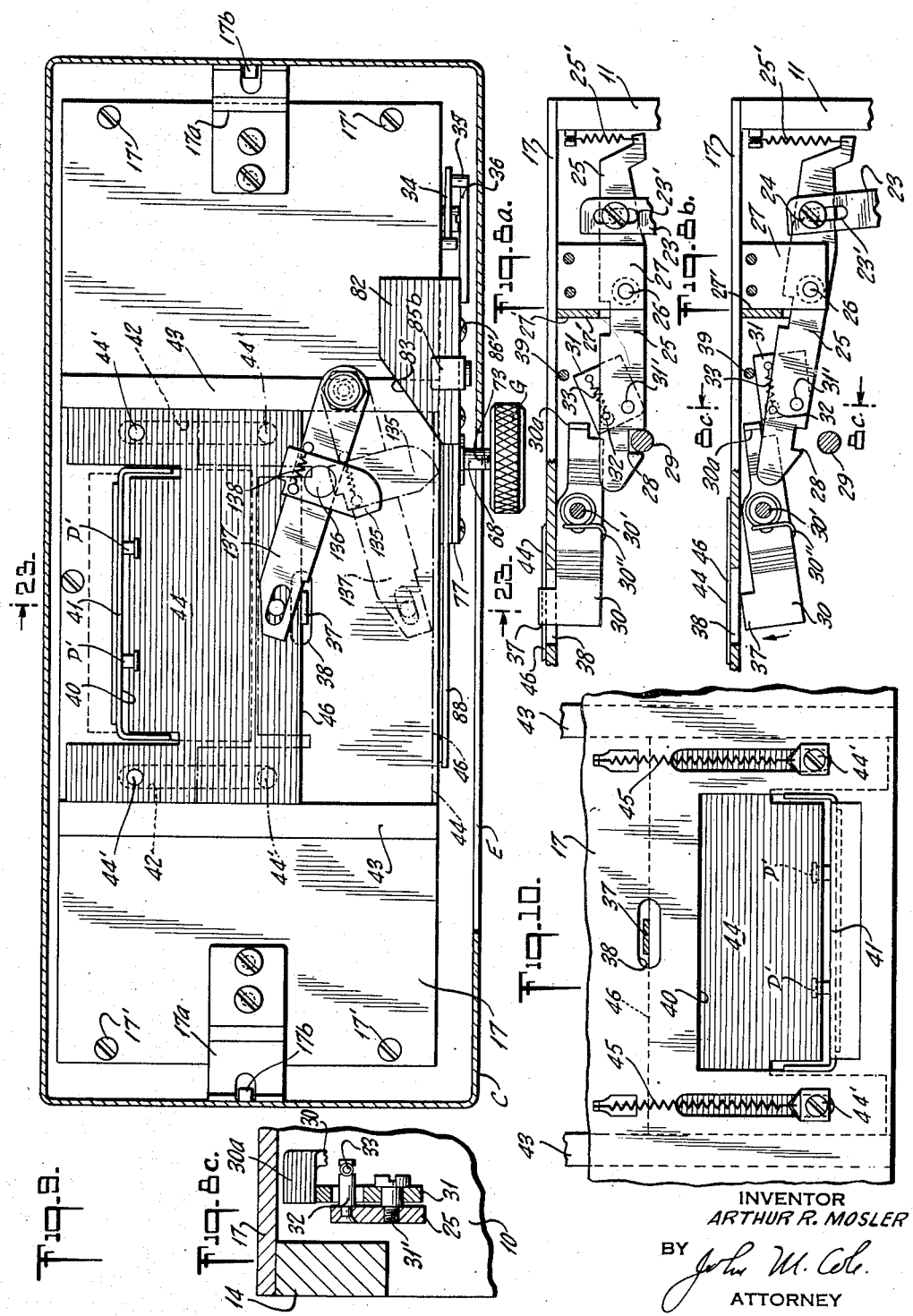
INVENTOR
ARTHUR R. MOSLER
BY
ATTORNEY

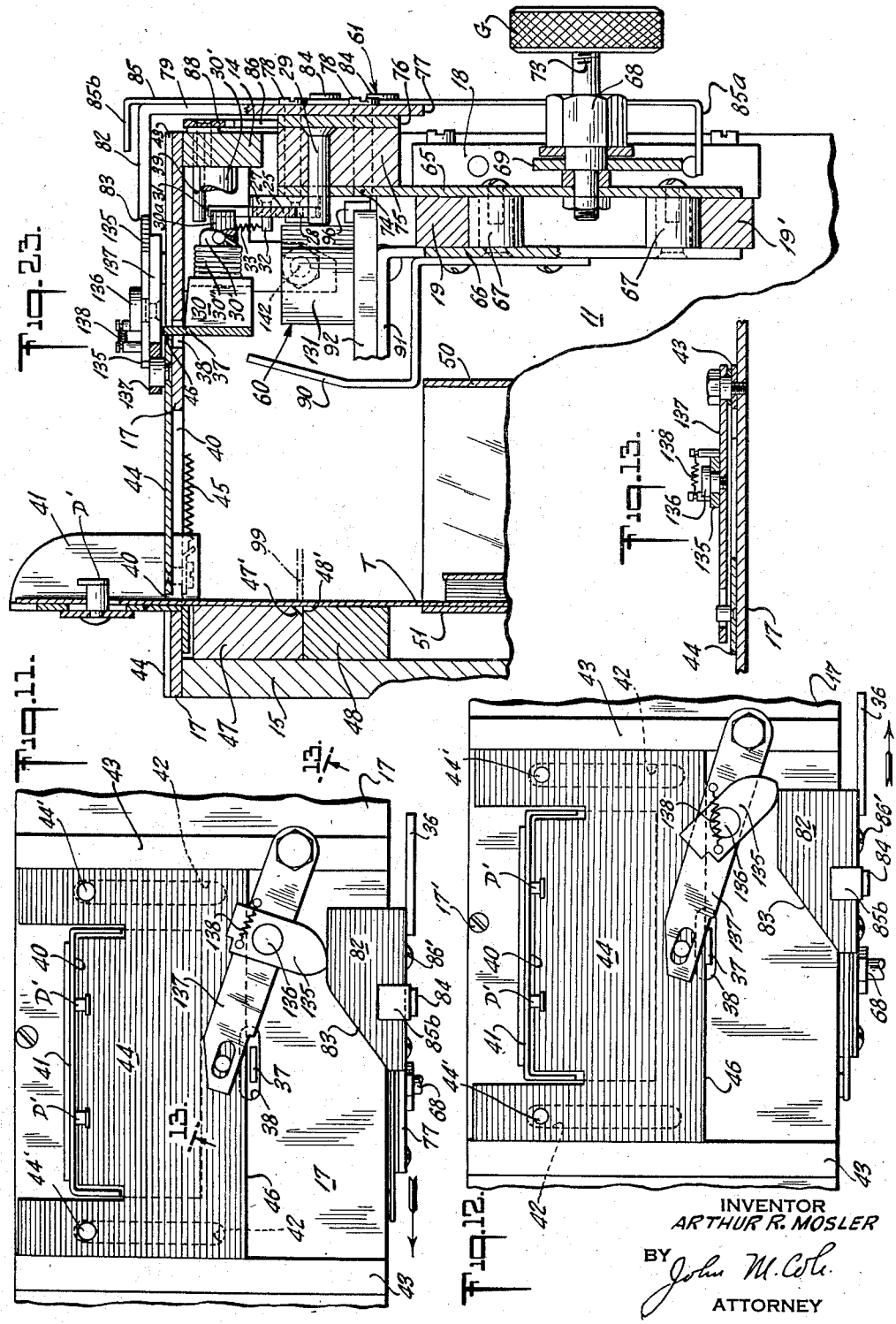

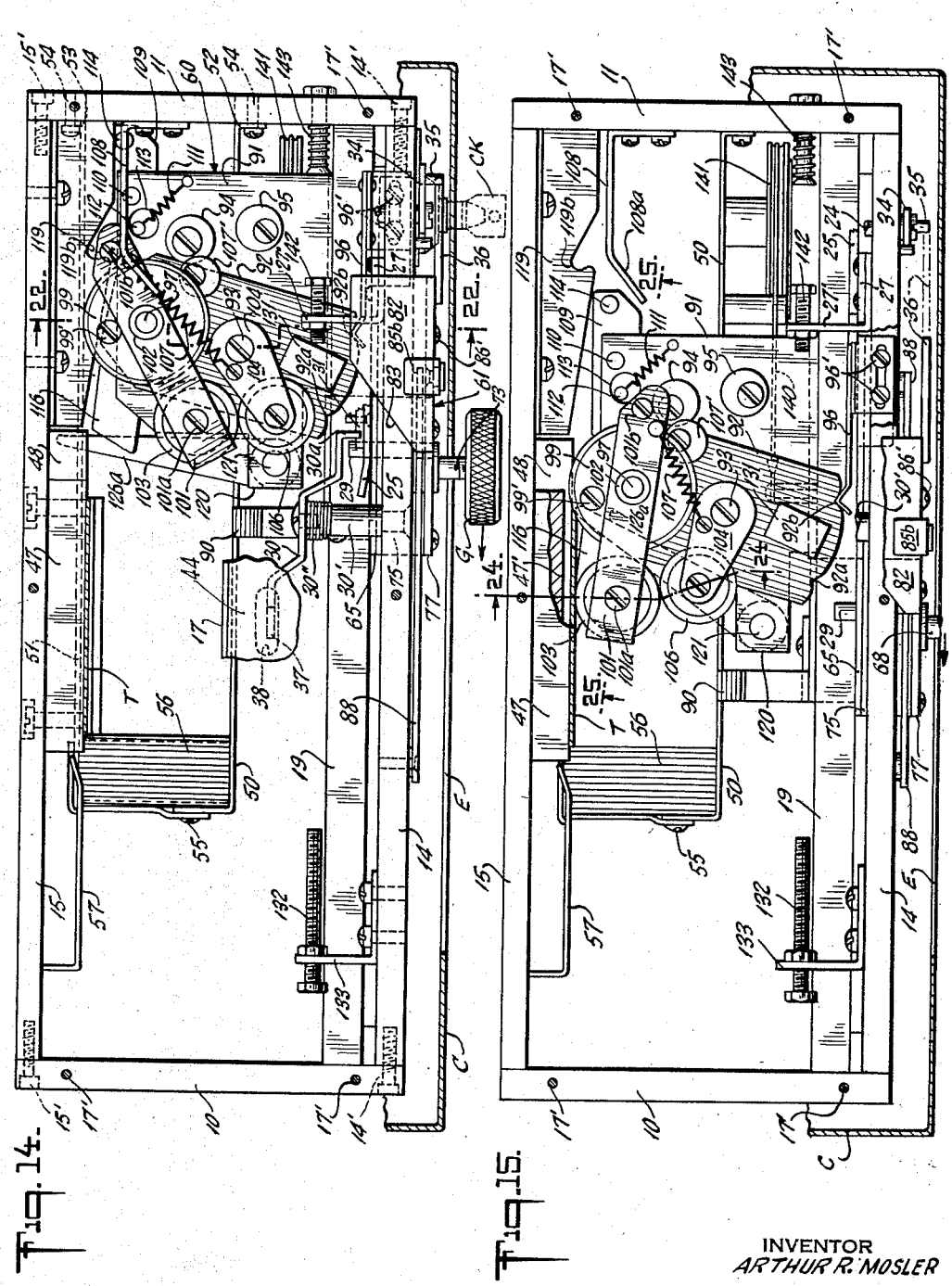

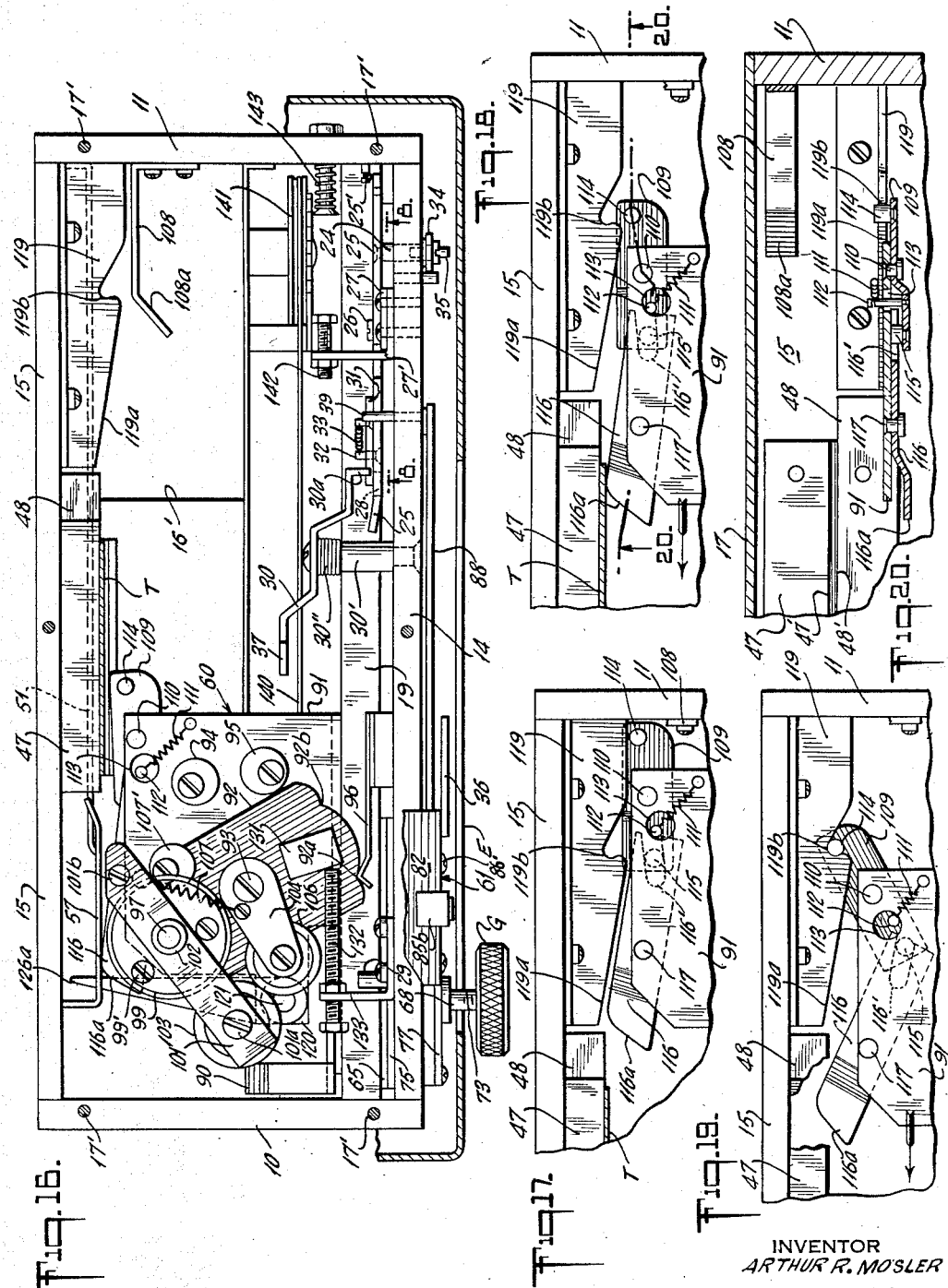

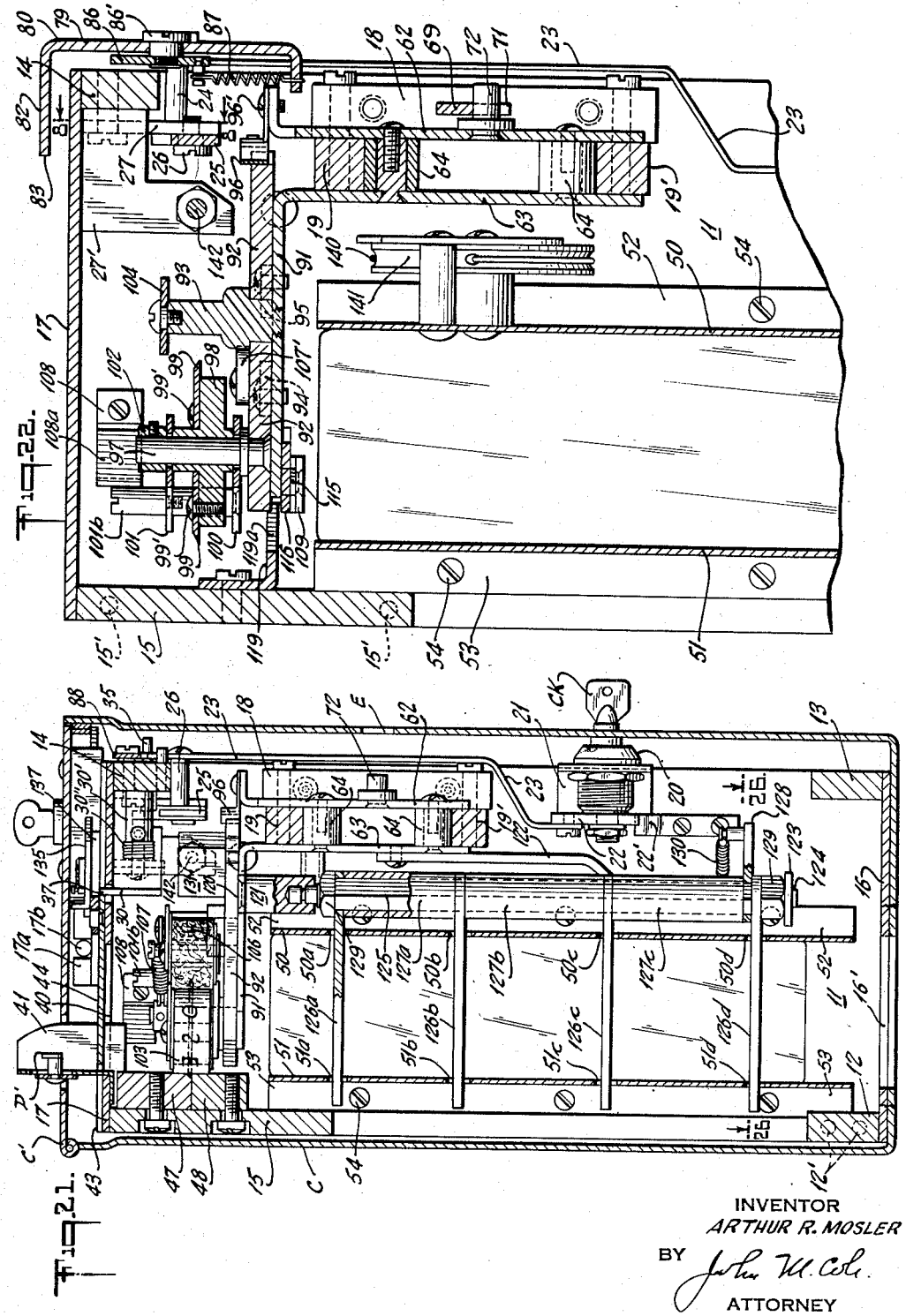

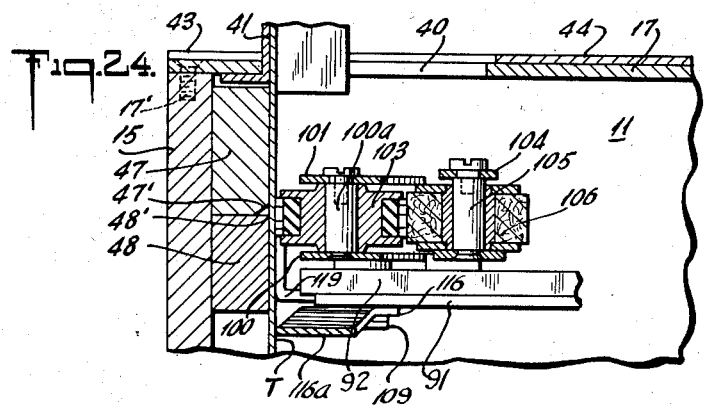
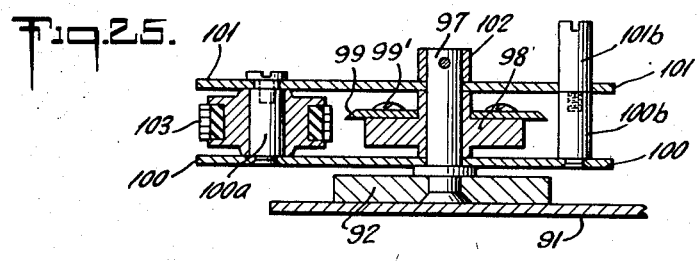
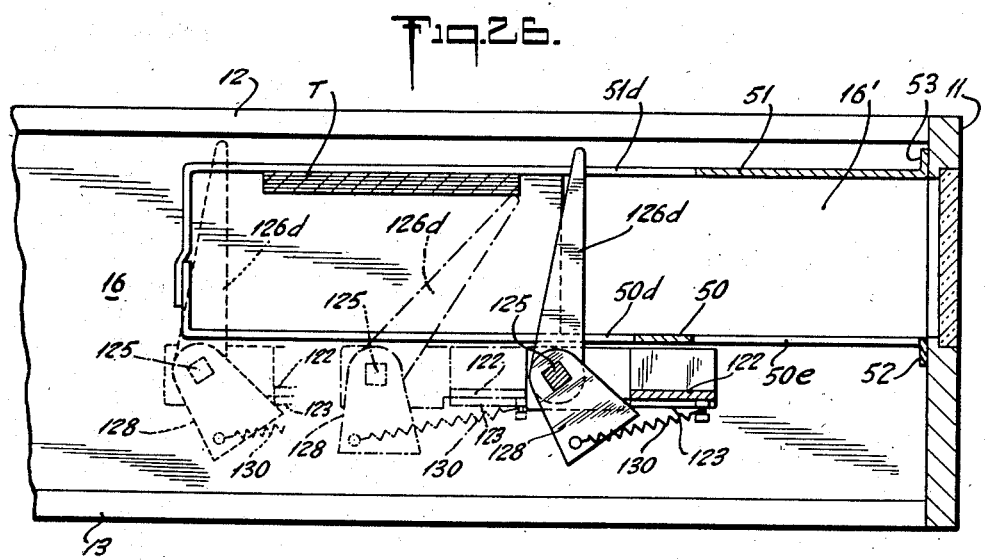

Jan. 11, 1955  A. R. MOSLER  2,699,372
DEPOSITING MACHINE
Filed March 14, 1952  18 Sheets-Sheet 10
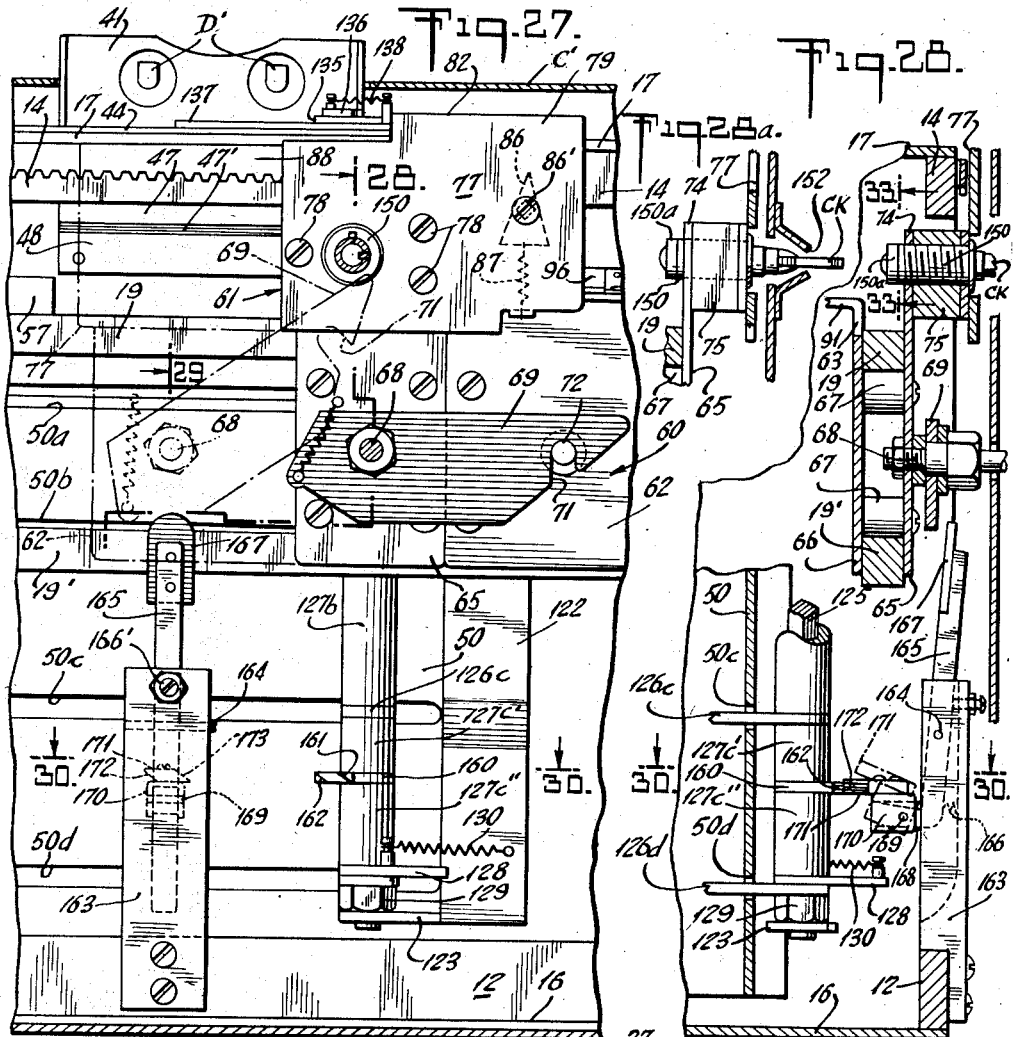
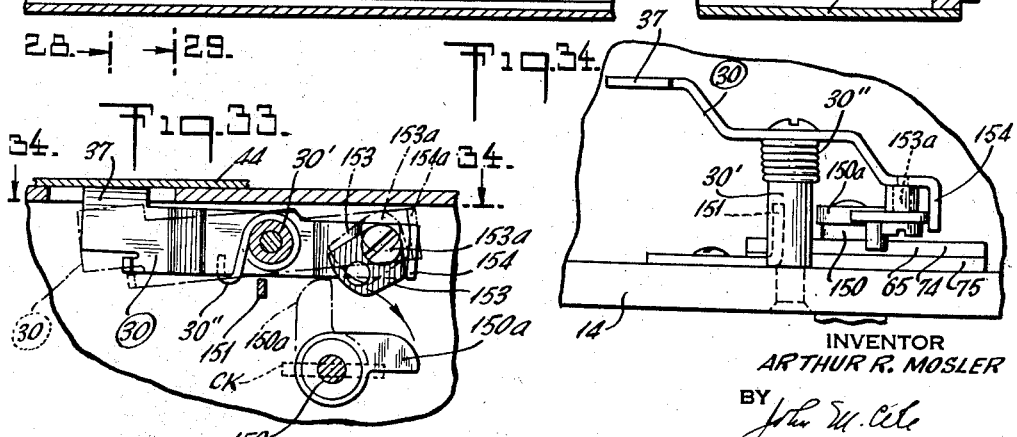
INVENTOR
ARTHUR R. MOSLER
BY
ATTORNEY

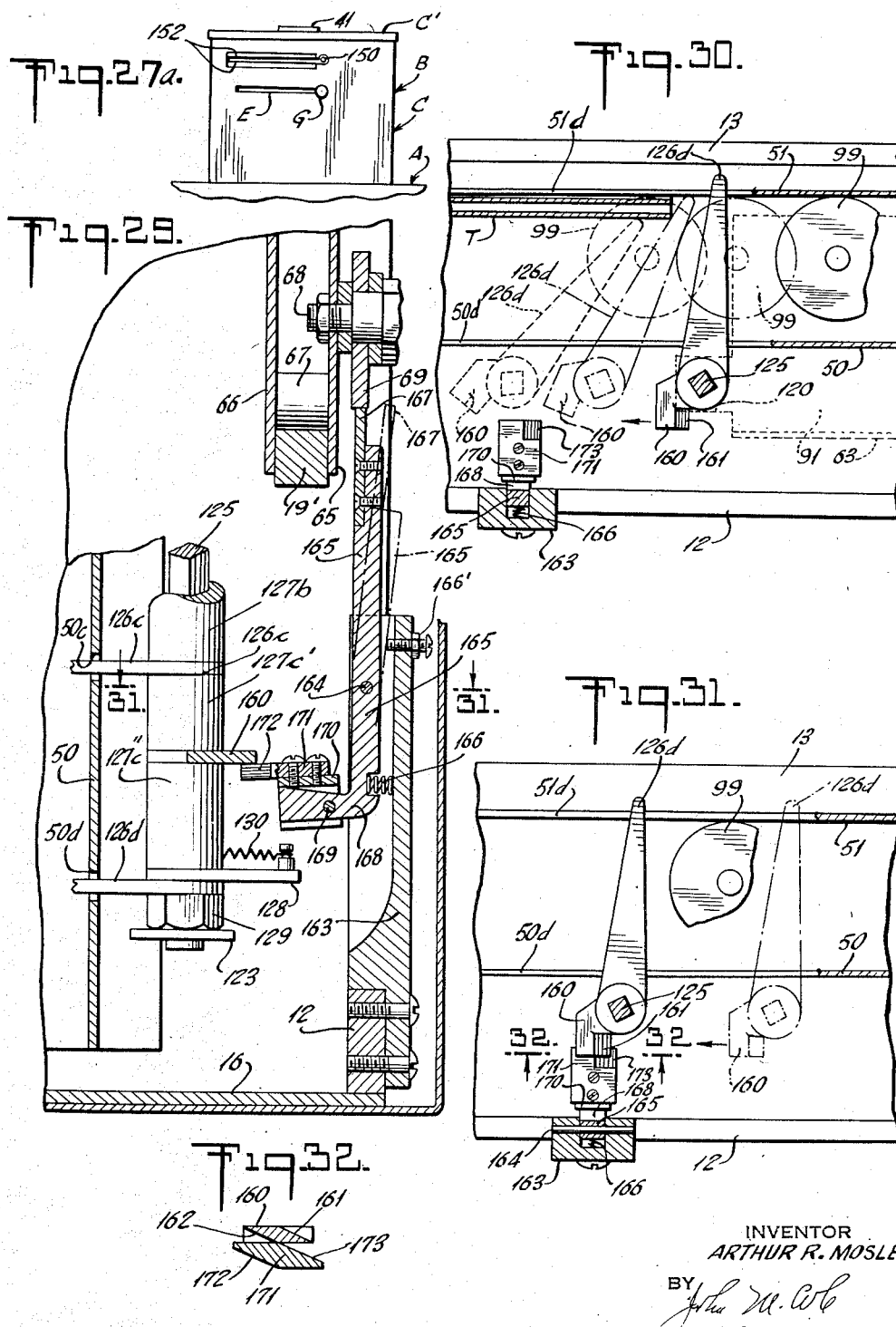

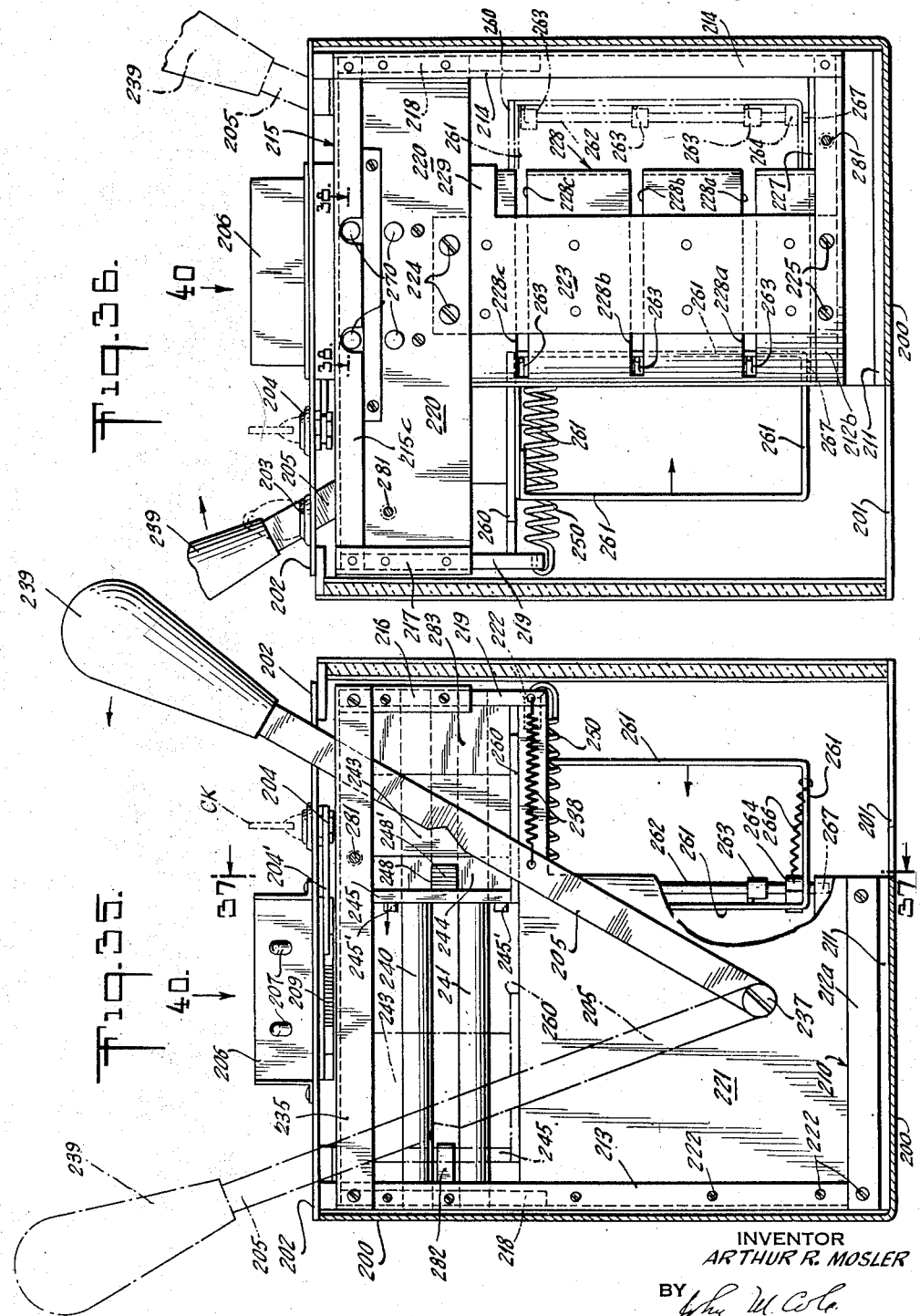

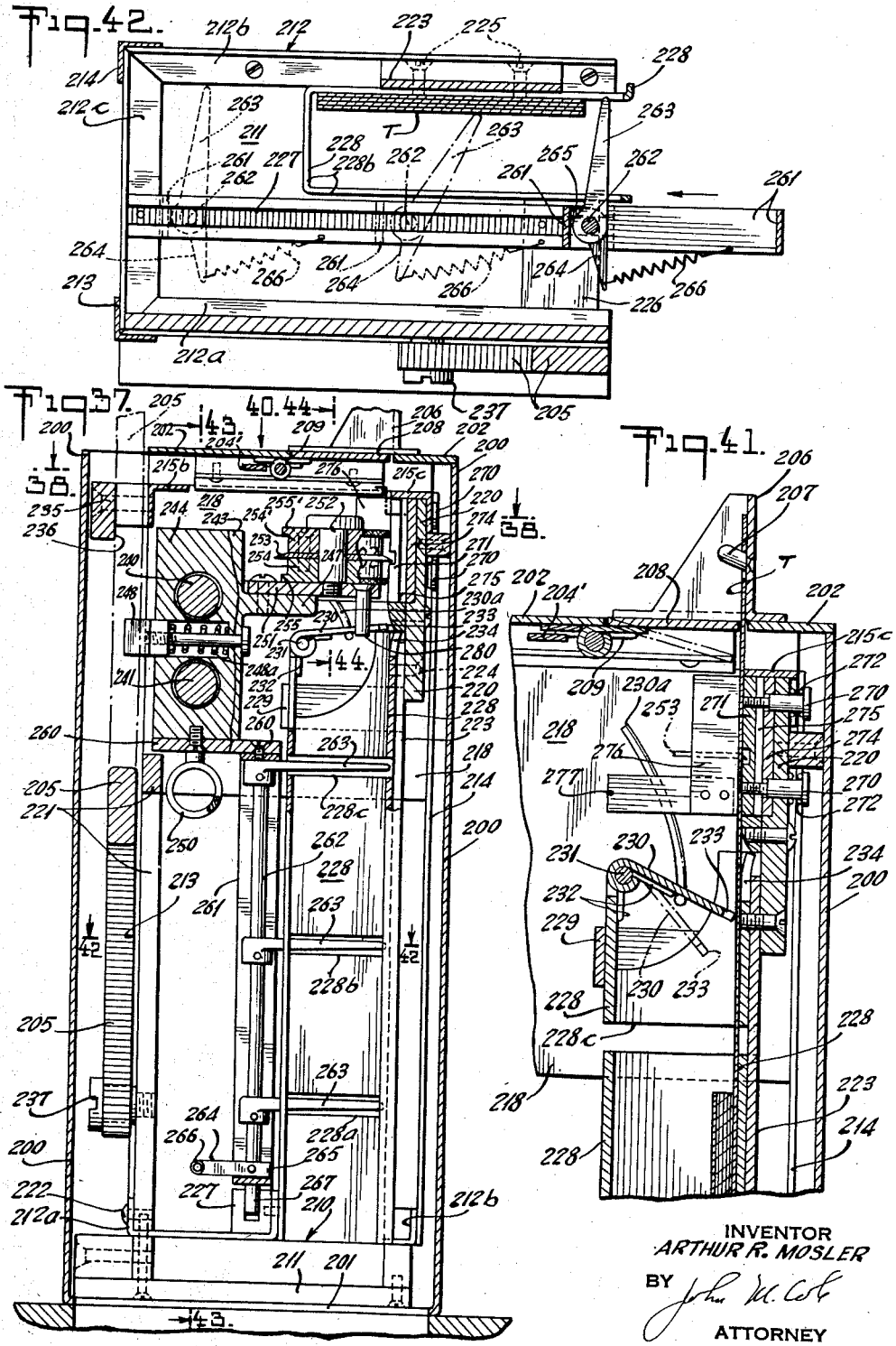

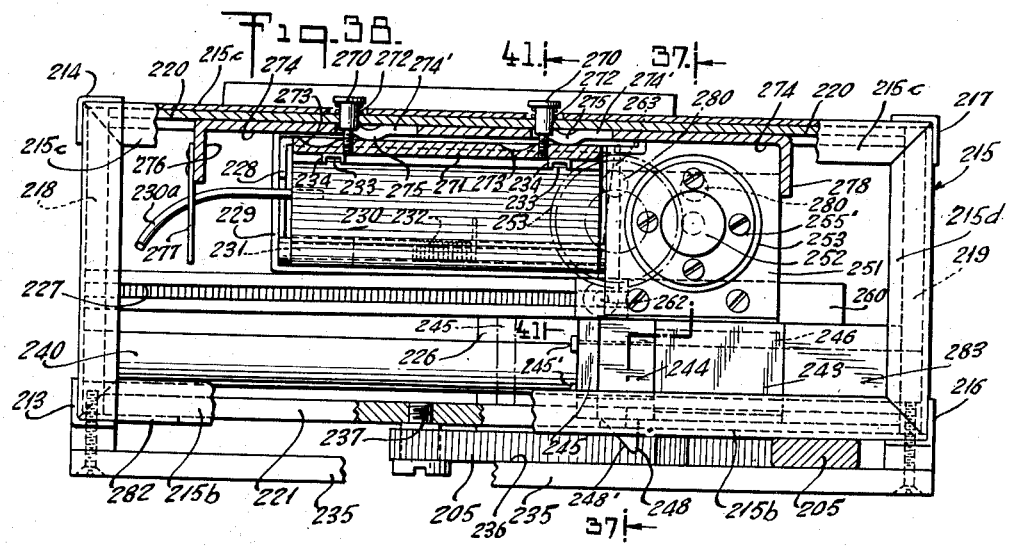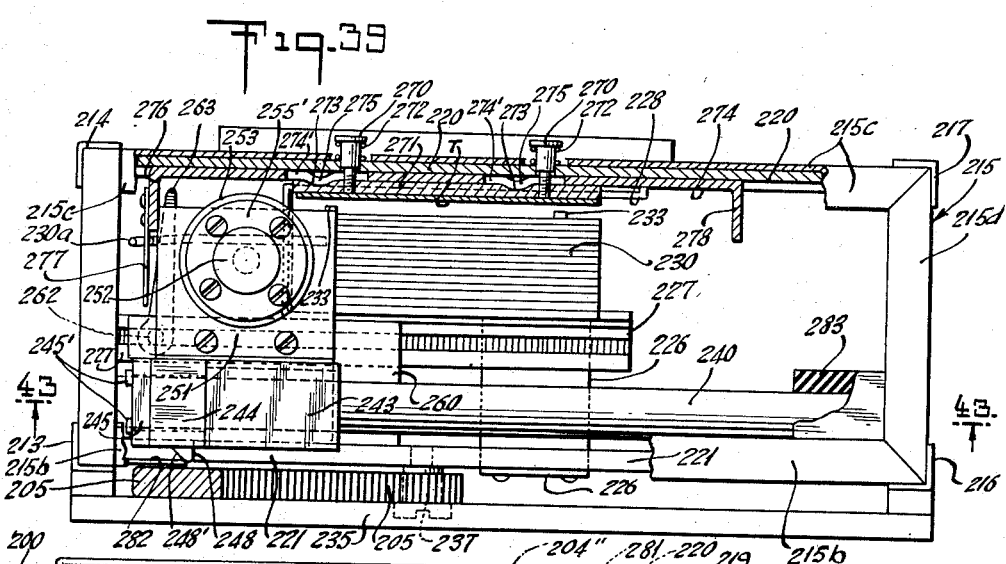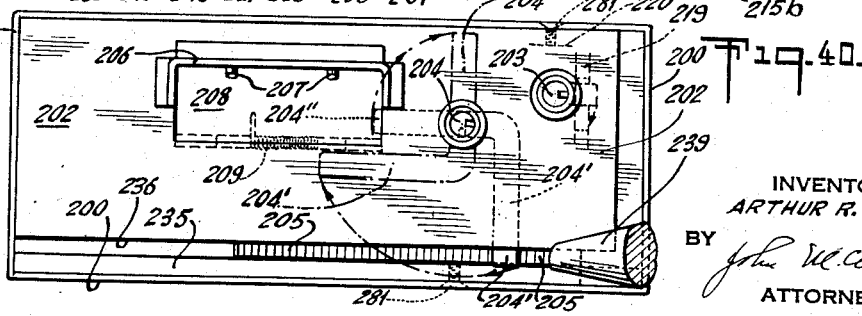

Jan. 11, 1955  A. R. MOSLER  2,699,372
DEPOSITING MACHINE
Filed March 14, 1952  18 Sheets-Sheet 15
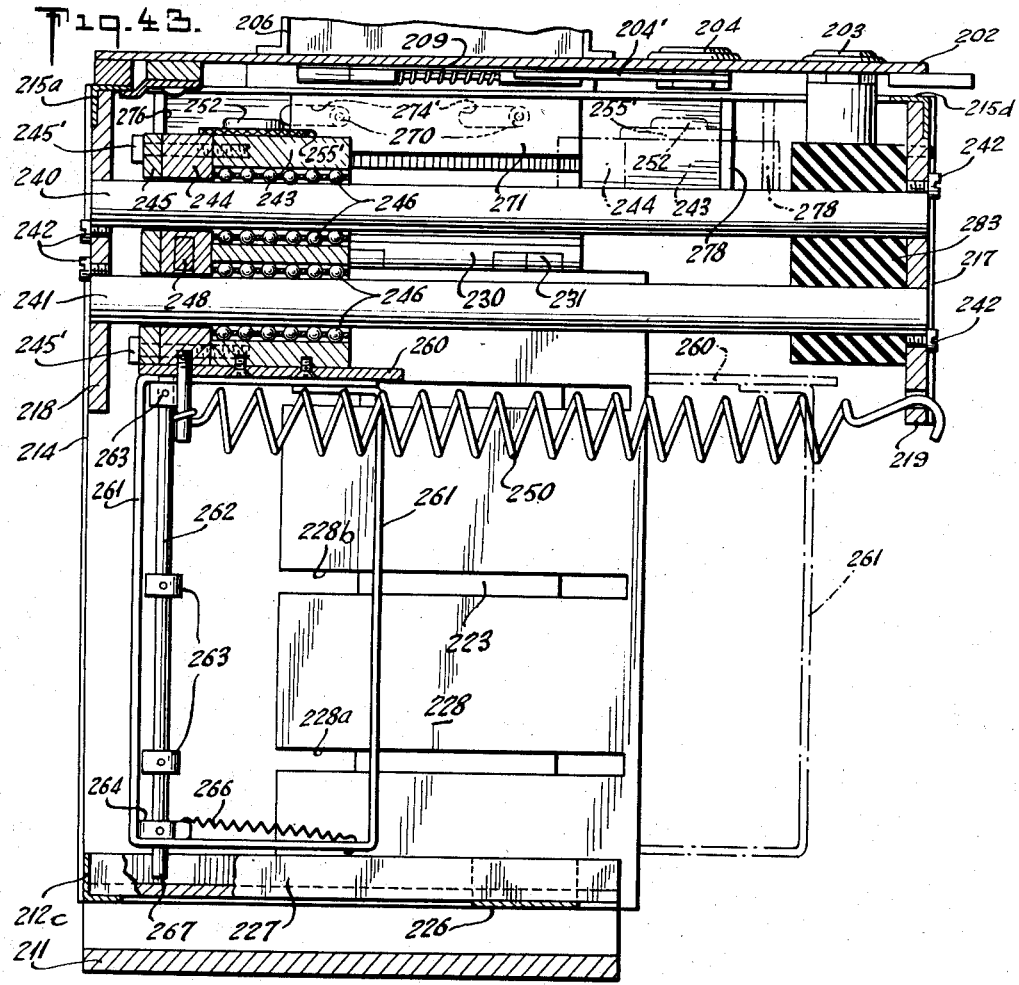
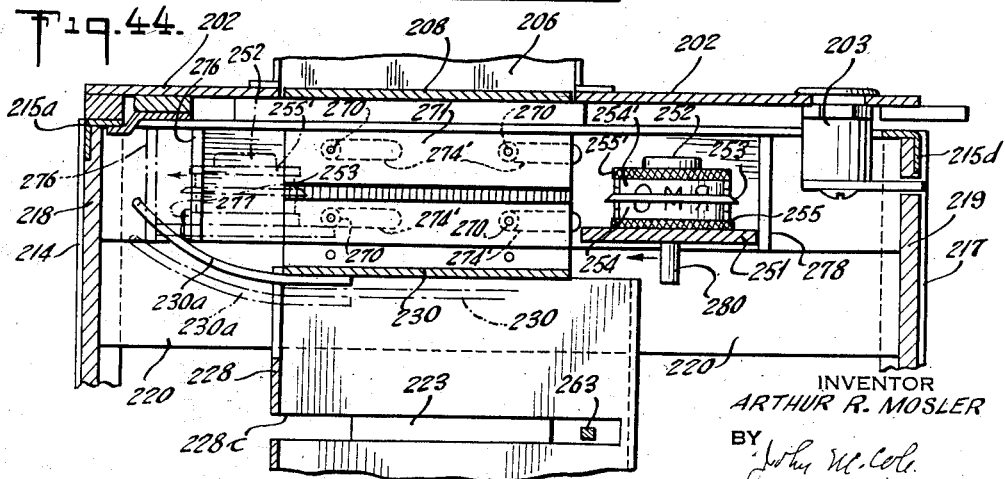
INVENTOR
ARTHUR R. MOSLER
BY
ATTORNEY

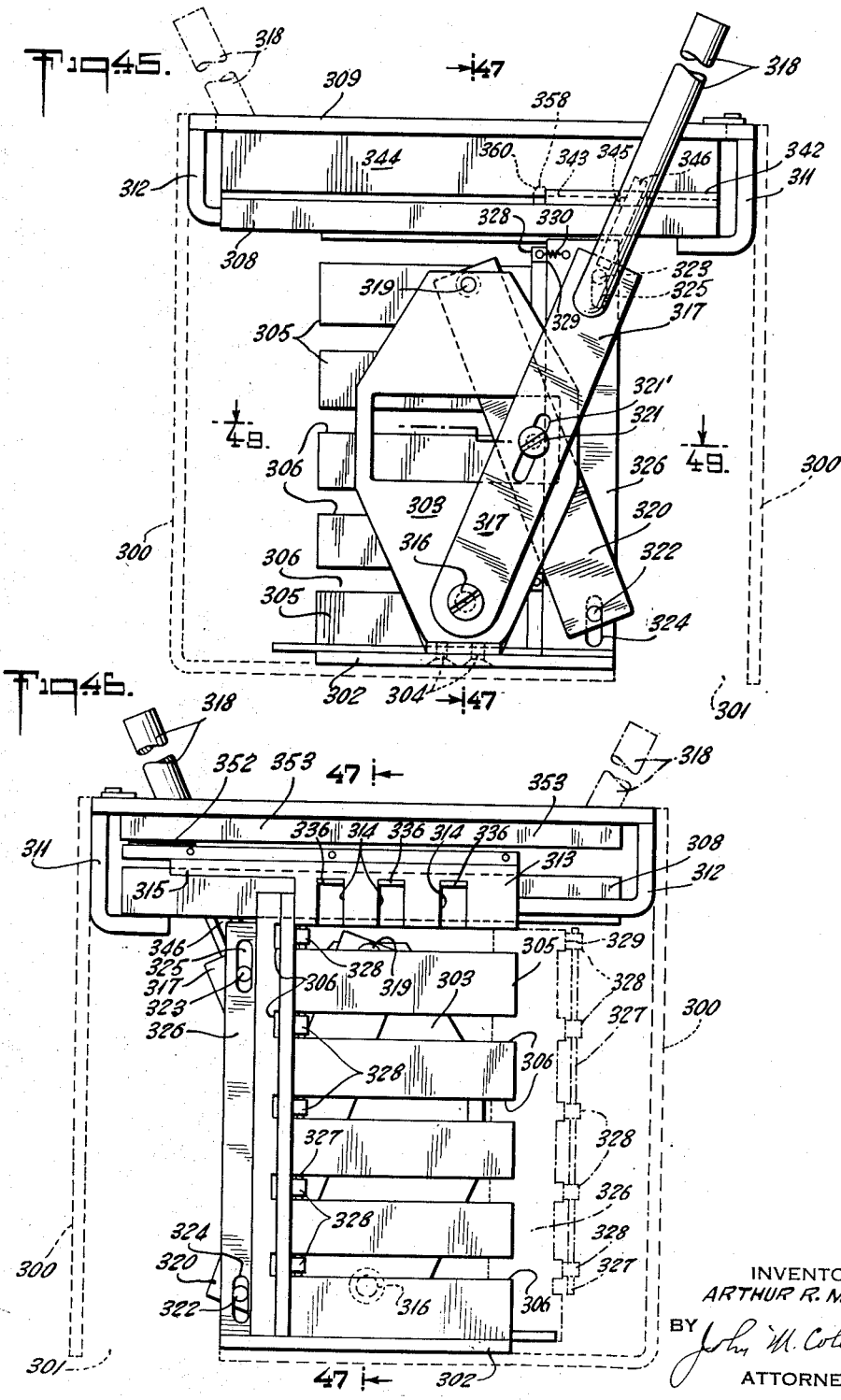

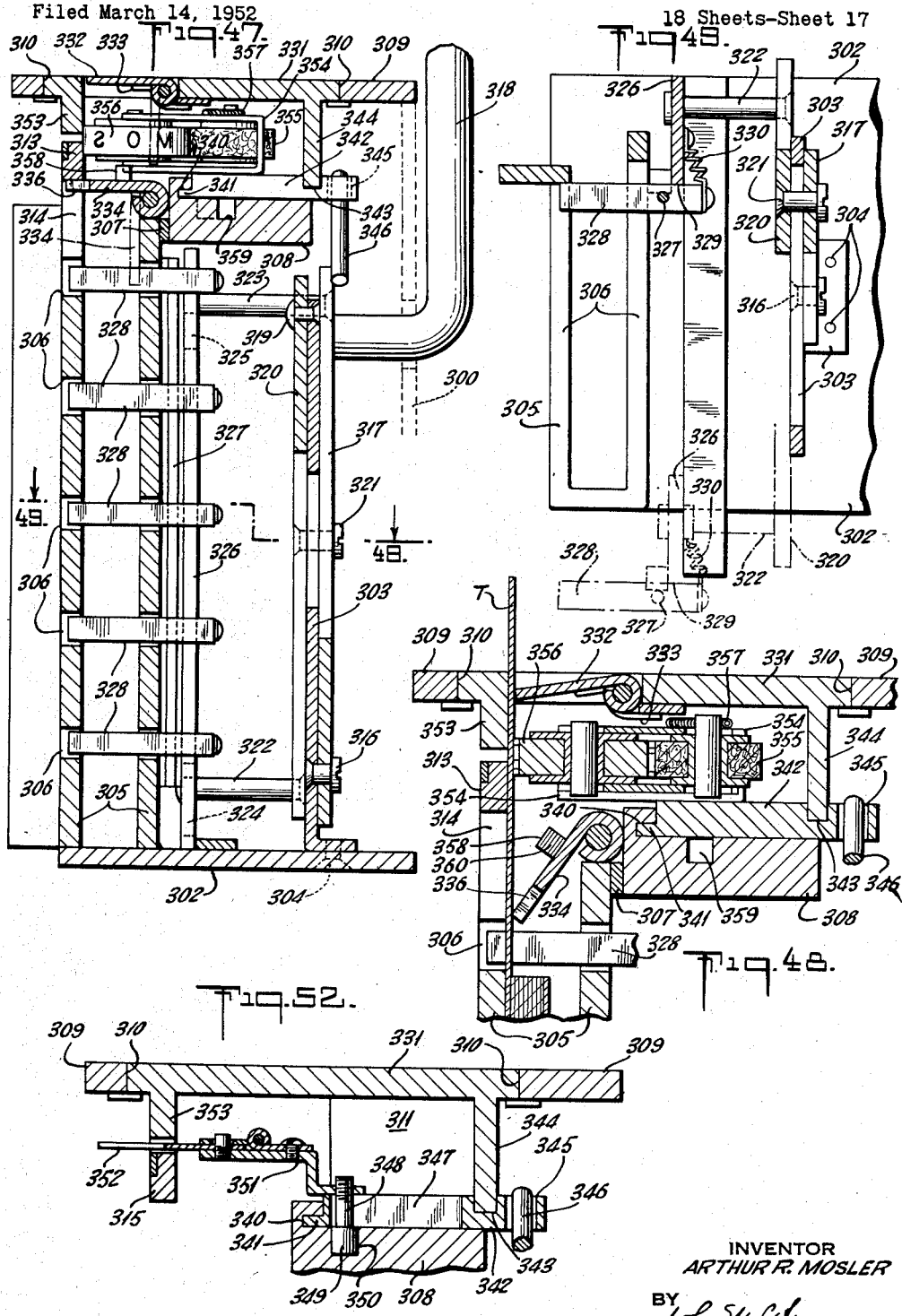

Jan. 11, 1955 A. R. MOSLER 2,699,372
DEPOSITING MACHINE
Filed March 14, 1952 18 Sheets-Sheet 18
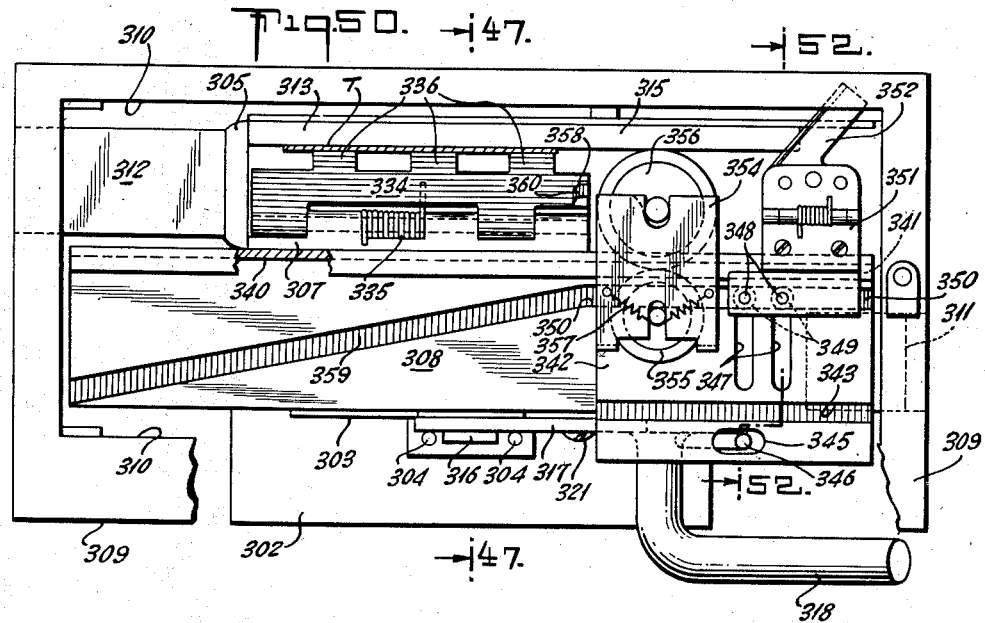
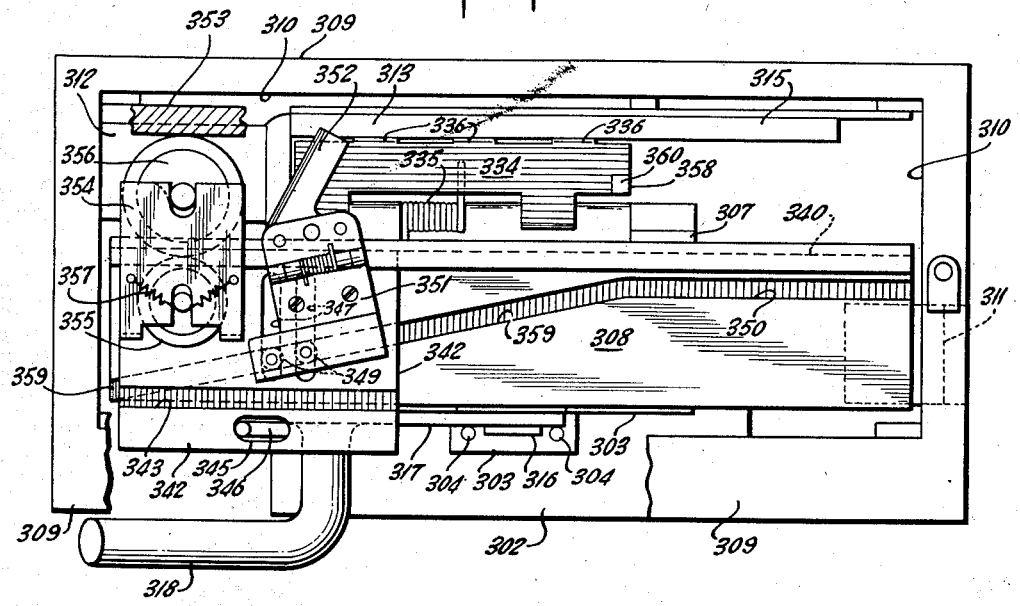
INVENTOR
ARTHUR R. MOSLER
BY
ATTORNEY

United States Patent Office 2,699,372
Patented Jan. 11, 1955

2,699,372
DEPOSITING MACHINE

Arthur R. Mosler, New York, N. Y., assignor to The Mosler Safe Co., New York, N. Y., a corporation of New York Application March 14, 1952, Serial No. 276,571

63 Claims. (Cl. 346—22)

The present invention relates to depositing machines.

In mercantile establishments, department stores and other types of business where large sums of money are received by sales personnel, collectors and the like, it is essential that adequate provision be made for accurate and expeditious accounting for the funds and for the safe storage of the same. In many establishments it is customary to have authorized persons make periodic pick-up of funds, and for the clerk to account daily at the cash stations for all the receipts. The time consumed in thus collecting and accounting for the receipts, where numerous employees are involved, may well be very substantial.

The present invention relates to depositing machines associated with high security safes so that a deposit may be made directly by the clerk and its safety is assured. A single machine can handle the deposits of a large sales personnel, for example, 100 persons, without making it necessary for anyone of them to go to a cash station or to be off sales duty for any appreciable length of time.

Ordinarily one of the depositing machines will be mounted on top of a safe at the height where one can readily manipulate it. It may, however, be mounted over a chute which leads to a master or main safe. The person making the deposit has no access to the mechanism of the machine, except so much as is made available by a key provided the person for the purpose. The mechanism of the machine is in a locked chamber or housing extraneous of the safe proper so that it can be serviced without having access to the valuables in the safe.

The deposits to be made are prepared by the depositor by aid of a deposit ticket and may include an accumulation of bills, coins, checks, etc. This deposit is preferably in the form of a package adapted to hang down inside the machine from a suitable support with bag for coins. It preferably includes two portions, one to provide one or more receipts removable by the clerk and evidencing the fact that a deposit has been made, and the other the tally sheet with the actual deposit.

Access to the support for the deposit is preferably possible when a normally closed top door is unlocked by one who has a proper key. At this time access to the safe is prevented so that pilfering is impossible. When the deposit package is placed in the machine, the depositor can then operate the machine through a predetermined cycle (preferably irreversible) during which the receipt portion of the ticket and deposit portions (both of which must be present) are each marked, as by printing or embossing to show that a deposit was made corresponding with the receipt, and vice versa, then the lower portion of the deposit package is severed from the other so that the receipt portion may be removed while the deposit portion has gone beyond the control of the clerk and cannot be recovered from the safe in an unauthorized manner. During this cycle the severed package is first intercepted so that it does not fall into the safe, and gravity discharge into the safe is thereafter effected, whereupon all the parts are restored to the first position and the key can be removed so that another deposit may be made.

The use of a suitable number of these depositing machines with safes or chests, makes it possible to provide local fire and burglary resistive protection and to avoid the daily queuing up of clerks who have had to go to the cash control office at the end of the day's work to turn in the sales receipts. The aggregate time consumed in such operations by a sales force is a large factor in the labor cost and is non-productive of sales. The machines to be shown and described herein are capable of handling well trained personnel very rapidly.

Other and further objects of the present invention will appear as the description proceeds.

The accompanying drawings show, for purposes of illustrating the present invention, three embodiments in which the invention may take form, it being understood that the drawings are illustrative of the invention rather than limiting the same.

In these drawings:

Figure 1 is a perspective view of one form of the depositing machine showing it mounted on top of a safe;

Figure 2 is a view at a small scale showing a clerk's ticket or deposit form extended or flat;

Figures 3–6 are diagrammatic views illustrating significant positions of the "deposit package" (including clerk's ticket with bills, coins, checks, etc.) during the cycle of operations, Figure 3 showing the ticket and filler in initial position and the printing, cutting and ejection devices in the home position of rest, Figure 4 showing the printing and cutting partly executed, Figure 5 showing the printing and cutting completed and the ejector device in position for action, and Figure 6 showing printing, cutting and ejection devices in the original position of Figure 3, the receipt stubs still in the initial position and the remainder of the ticket and the filler falling into the safe;

Figure 6a is an elevational view at a small scale of the machine taken from the left, the top or door carrying plate being removed and showing in single line outline the enclosing housing with the top cover opened;

Figure 7 is a front elevational view of one form of the machine, except for the housing which is in section, the machine being in idle position and completely locked;

Figure 7a is a fragmentary view illustrating the initial movements effected by turning the clerk's key in the lock;

Figure 7b is a similar view with carriages slightly moved and the key automatically locked against removal;

Figure 7c is a section taken on the line 7c—7c of Figure 7b;

Figure 8 is a view similar to Figure 7 with parts of the machine in section on the line 8—8 of Figures 16 and 22, the machine being unlocked for operation by the clerk, the pull carriage in extreme left position and the cutting carriage released and on its way back to the home position;

Figure 8a is a fragmentary view of the top door release mechanism in normal or locked position;

Figure 8b is a fragmentary view of the top door release mechanism in an intermediate position of the key during unlocking, the top door having opened;

Figure 8c is a section along the line 8c—8c of Figure 8b;

Figure 9 is a top plan view of the machine with the top plate in position and showing in full lines the door thereon latched closed, and in dot and dash line the door opened;

Figure 10 is a fragmentary inverted plan view of the top plate and top door, latched closed;

Figures 11 and 12 are fragmentary top plan views showing, respectively, the closing of the top door during the forward movement of the carriage and the resetting of the door closing latch during the return of the carriage;

Figure 13 is a fragmentary sectional view on the line 13—13 of Figure 11;

Figure 14 is a top plan view of the machine with a fragment of the top door in open position and the top plate otherwise removed, the machine being unlocked by the clerk, the parts in the initial or home position, and the front wall only of the housing being in section on the line 14—14 of Figure 6a;

Figure 15 is a top plan view similar to Figure 14, illustrating the cutting and pull carriage and associated parts moved far enough to the left to be in the position for printing and severing;

Figure 16 is a top plan view, similar to Figures 14 and 15, but illustrating the carriage in the extreme left position and the printing and cutting devices in position for return clear of the ticket;

Figure 17 is a fragmentary top plan view with parts removed, showing the carriage lock in the initial position (Figure 7);

Figures 18 and 19 are views similar to Figure 17 showing in Figure 18 the cutting carriage stop lock held open by the ticket to allow the carriage to move further to the left, and Figure 19, the same in the absence of a ticket and engaged to stop further movement of the carriages;

Figure 20 is a vertical section on the broken line 20—20 of Figure 18;

Figure 21 is a vertical sectional view through the locked housing taken from the left and showing parts of the machine in elevation beyond the left frame plate and parts in section;

Figure 22 is an enlarged vertical cross-section on the broken line 22—22 of Figure 7 to show the cutting carriage in section;

Figure 23 is an enlarged vertical cross-section taken on the broken line 23—23 of Figures 7 and 9 to show the pull carriage in section;

Figure 24 is a fragmentary section view on the line 24—24 of Figure 15 to show the inking and printing rollers;

Figure 25 is a section on the line 25—25 of Figure 15 showing the assembly of the oscillatory carrier for the printing roller and the cutter;

Figure 26 is a section on the line 26—26 of Figures 7, 8 and 21 showing the ejector in extreme and intermediate positions;

Figure 27 is a fragmentary front view similar to Figure 7 showing a modified form of construction in which the lock opened by the clerk's key is on the pull carriage and unlocked, and having a modified form of package feeler, the parts also being in dot and dash lines in position for release of the pull carriage from the cutter carriage due to absence of a complete deposit package;

Figure 27a is a front elevational view of the housing for the machine of Figure 27;

Figures 28 and 28a are vertical sections on the line 28—28 of Figure 27;

Figure 29 is a fragmentary vertical section on the line 29—29 of Figure 27 showing the carriage in the released position corresponding with the dot and dash position of Figure 27;

Figure 30 is a fragmentary section on the line 30—30 of Figures 27 and 28 with the parts in idle position; and in dot and dash lines in the positions assumed when the package is present and the carriages moved;

Figure 31 is a fragmentary section on the line 31—31 of Figure 29 showing in full lines the ejector fingers in position to trip the pull carriage;

Figure 32 is a fragmentary section on the line 32—32 of Figure 31;

Figure 33 is a fragmentary section on the line 33—33 of Figure 28 showing the lock in unlocked position in full lines and in locked position in dotted lines;

Figure 34 is a fragmentary top plan view of the lock mechanism actuated by the clerk's key;

Figures 35 and 36 are front and rear views, respectively, of a modified form of deposit machine with the operating handle in full lines in the normal position of rest and in dot and dash lines at its other extreme position, the housing being in section;

Figure 37 is a vertical sectional view taken on the line 37—37 of Figures 35 and 38, the parts being in the position taken when no deposit package is present;

Figures 38 and 39 are top plan views of the machine with parts in section on the line 38—38 of Figures 36 and 37, Figure 38 showing in full lines the cutting and printing or embossing mechanism in idle position, and in dot and dash lines the farthest movement possible of the same in the absence of a deposit package, Figure 39 showing the printing and cutting mechanism in the extreme left position and the clerk's receipts in position;

Figure 40 is a top plan view of the housing taken in the direction of the arrow 40, Figures 35, 36 and 37;

Figure 41 is a vertical sectional view at an enlarged scale, taken on the line 41—41 of Figure 38, with a deposit package in place;

Figure 42 is a fragmentary horizontal sectional view on the line 42—42 of Figure 37, showing a deposit package in place and the ejector fingers in various positions assumed during the cycle of operations;

Figure 43 is a vertical section on the line 43—43 of Figures 37 and 39, with the carriage in the extreme left in full lines and in the extreme right in dot and dash lines;

Figure 44 is a fragmentary vertical section on the line 44—44 of Figure 37, the parts also being shown in dotted lines in the extreme left position of the cutter carriage;

Figures 45 and 46 are front and rear elevational views respectively of a still further modified form of construction with the parts in the normal position in full lines and in the other extreme position in dot and dash lines;

Figure 47 is a vertical section on the line 47—47 of Figures 45 and 46 and 50;

Figure 48 is a fragmentary sectional view at a larger scale than Figure 47, showing a package inserted and the printing roller advanced to printing position;

Figure 49 is a horizontal sectional view on the line 49—49 of Figures 45 and 47;

Figures 50 and 51 are top plan views with the cover removed and parts broken away, the cutter and printer being in the normal position in Figure 50 and in the other extreme position in Figure 51; and Figure 52 is a section on the line 52—52 of Figure 50.

*The diagrammatic showing of Figures 1–6*

Figure 1 indicates at A a safe having the usual door and safe-door locking mechanism. The safe has an entrance opening for the deposits, for example, the hole indicated at A', Figures 3–6. Mounted on top of the safe A is the depositing machine B, to be discussed hereinafter in detail.

The operating mechanism of the depositing machine is in a metal box or housing C with a hole in the bottom aligned with the hole in the safe. The housing is securely secured to the safe and the depositing machine is removably secured in the housing. The housing has a hinged cover C' provided with a key operable master lock C'' and having a hole $C^3$ through which protrudes a ticket guide and ticket holder D having ticket engaging means in the form of studs D'D'. The front of the housing has a horizontal slot E through which extends a carriage operating handle G. The front also has an opening H to permit insertion of a clerk's key. When this key is inserted and turned, as will be set forth below, a top door in front of the ticket holder opens.

One form of ticket or deposit form is illustrated at T in Figure 2 and shown in detail in my application Ser. No. 276,572 filed concurrently herewith. The ticket is made of medium weight paper stock of suitable width and length (for example 3¼″ x 18″). At the upper end, it has two holes T', T' spaced the same as the studs D', D' and perforation T'' between these holes so that two receipts $T^1$ and $T^2$ may be had after the deposit is completed. It may be notched as indicated at $T^3$. It is provided with blanks for the clerk making the deposit to fill in and sign, has a fold line $T^4$ and carries three printed numbers for identification of the deposit, the clerk's receipt $T^1$ and of the cash control box receipt $T^2$. The numbers on the deposit end of the ticket are spaced below the numbers on the receipt stub.

When the clerk is to make a deposit, all details necessary for accounting control and itemization of receipts, such as bills, coins, checks, etc. are entered on the front, the ticket signed and the lower end of the ticket folded onto the deposit and secured to the front or back by strips of gummed paper $T^6$ attached as indicated in Figure 3. The deposit package is then lowered through the open hole $C^3$ in the top of the housing and hung on the pins D', D'. It extends down past pressure blocks P, P' and is to the left of a printing or embossing roller R, a rotary cutter K and ejector fingers, one of which appears at F.

After unlocking the machine and placing the deposit on the pins D', D', the clerk shifts the grip or operating knob G to the left and this carries with it, as shown in Figures 4 and 5 and as it will be further explained, the printing roller R, cutter K and ejector F. The roller makes an impression below the receipt numbers and above the numbers at the end of the ticket to be deposited (for example the name of the store); the cutter severs the ticket, after printing, so that part of the printing is below the cutting line and part above it. The fingers F of the ejector yield and pass over the ticket. After severing, the deposit drops away from the ticket stubs $T^1$, $T^2$.

At the end of the leftward stroke, the roller R, cutter K and ejector F are released, as will be explained, and move to the right to the initial position as indicated in Figure 6. During this movement, the fingers F engage the deposit and move it over past the hole A' in the top of the safe so that it falls into the safe.

The clerk can now return the operating handle G, remove the key, take off the stubs and tear them apart, keeping one for the personal record and putting the other one in the cash control box.

*The machine frame*

In the machine shown in detail in Figures 6a–26, all operating parts are carried on a frame adapted to be lowered into the housing C through the top when the cover C' is open. The housing is bolted to the safe and the machine non-removably secured by the cover, when locked.

The frame has a left end plate 10, a right end plate 11 and distance pieces or bars 12, 13 at the bottom, 14 at the upper front and 15 at the upper rear, secured to the end plates by screws 12', 13', 14' and 15'. At the bottom is secured a plate 16 having a discharge opening 16' (Fig. 7) over the safe inlet hole A'. Across the top is a removable top plate 17 secured in place by screws 17'. The top plate is provided with laterally extending brackets 17a, 17a, notched as indicated and engageable with pins 17b, 17b in the housing walls to align the machine in the housing.

Along the front edges of the end frame plates are two carriage rail supports 18, 18 and these carry upper carriage rail 19 and lower carriage rail 19', here shown as square bars.

*The key operated mechanism*

The operations which the clerk can carry out with the machine contemplate the use of a key to unlock the mechanism so that unauthorized persons cannot tamper with the machine. The lock operated by the clerk's key CK is preferably stationary. The lock shown at 20 is carried by a bracket 21 secured to the right end frame member 11. It is of the type in which the key CK is inserted, pressed in against the pressure of springs, then turned a quarter of a revolution, and is held against removal until returned to its original angular position. The lock arm 22 is vertical when locked (Fig. 7) and is horizontal (Fig. 8) when unlocked. It is held in one position or the other by a spring detent 22'.

The arm 22 of the clerk's lock is connected to a vertically extending link 23 having in its upper end (in front of distance piece 14) an elongated slot 23' which receives a stud 24 extending beneath the distance piece (Fig. 7c) from a horizontally extending lever 25 pivoted at 26 on a plate 27 secured to the distance piece 14 to the rear of a bracket 27' to be referred to below. The right hand end of the lever 25 is biased counterclockwise by a spring 25' and at the left it has a notch 28 normally engaged with a carriage locking pin 29 which is in the position indicated when the pull back and cutting carriages to be described are in the home position.

To the left of the left end of the lever 25 is a top door locking lever 30, normally in the position shown in Figure 8a and supported on stud 30' biased in a clockwise direction by spring 30''. The right hand end of lever 30 is bent forwardly at 30a and as shown in Figures 8a–8c is in the path of a door locking lever release plate 31 pivoted to lever 25 at 31'. The plate 31 is biased counterclockwise against a pin 32 by a spring 33.

Above the upper end of link 23, the upper front distance piece 14 carries a pendant retaining dog 34 normally resting on top of the link as shown in Figure 7. This dog has forwardly projecting pin 35 which is then above a dog lifter or retracting member 36 carried by the pull back carriage and in the position indicated when the latter is in the home position.

When the clerk's key CK is turned part way through its path, the upper end of the slot 23' engages stud 24 (Fig. 7a) and then moves the lever 25 from the position of Figure 8a to that of Figure 8b. The upper left corner of the plate 31 engages the bent end 30a on lever 30 and swings this lever to the position of Figure 8b so that the left end 37 of the lever 30 moves from a position where it projects through hole 38 in top plate 17 and above the upper face of this plate 17 to lower position, thereby releasing a top door to be described.

Further movement of the key, after the opening of this top door is effected, brings the plate 31 against a fixed pin 39 and shifts the plate 31 to the position of Figure 8, whereupon spring 30'' regains control of the lever 30 and brings it against the bottom of the now open top door.

The upper plate 17 has a deposit receiving opening 40 and fixedly supports a deposit guide 41 with the ticket supporting pins D', D'. At each side of the opening 40 the plate 17 has slots 42, 42 and guide strips 43, 43. A top door 44, in the form of a flat plate, is slidably carried on the upper face of the plate 17. It has pins 44' in these slots and is biased forwardly by springs 45, 45 under the plate (Fig. 10). The front edge 46 of this top door is engaged by the left end 37 of lever 30 when in the up position (Fig. 9) so as to lock the top door closed and to release it for opening when the key CK actuates the linkage as above described. The lever then bears against the lower face of the top door.

*Acceptance of deposit*

The machine having been conditioned as above described for the acceptance of a deposit, the ticket T with deposit is inserted through the deposit opening 40 and suspended from the pin as shown in Figure 23. It extends down past upper and lower pressure blocks 47, 48, the upper one cut back as shown at 47' and the other square at 48' to form a shearing edge.

The deposit is received between the front and rear halves 50, 51 of a package retainer or cage. These are flanged forwardly and rearwardly as indicated at 52, 53, Figure 21, are secured to the righthand end plate 11 by screws 54, and are secured together at the left by screws 55. The left edge of the cage shown is to the left of the guide 41 and carries deflectors 56 (Figure 7). The front and rear walls of the cage have four horizontal aligned leftwardly opening slots 50a, b, c, d and 51a, b, c, d, the latter extending further to the right than the former. The front half at the lower right has an opening 50e to permit access to this part of the cage. The upper left corner of the cage carries a release cam 57 for a feeler finger.

*The reciprocating mechanism*

The carriage rails 19, 19' support two carriages. The one at the right designated generally at 60, is called the cutter carriage, and carries printing or embossing mechanism, cutter mechanism and ejector mechanism, while the other designated 61 is called the pull carriage. These carriages are coupled together when at the right, i. e., the idle or home position, are manually movable to the left while thus coupled, are automatically disengaged at the extreme left position and the cutter carriage 60 is returned by a spring.

The cutter carriage 60 has a front plate 62 and rear plate 63 between which are mounted four rollers 64 bearing against the carriage rails. The pull carriage 61 also has front and rear plates 65 and 66 between which are mounted four rollers 67 bearing against the carriage rails. The front plate 65 of the pull carriage carries a stud 68 on which is pivotally mounted a latch lever 69, biased clockwise by a spring 70 and having a notch 71 to engage a pin 72 carried by the front plate 62 of the cutter carriage to lock the two carriages together. The stud 68 is threaded at 73 to removably receive a pull grip or knob G.

The front plate 65 of the pull carriage extends upwardly above the carriage rails as indicated at 74, Figs. 7, 8, and 23, and carries a block 75 in which is mounted the pin 29 above referred to. This pin projects rearwardly (Fig. 23) and is in engagement with the horizontal lever 25 until the key is turned to release it. The head of pin 29 is held against removal by a spacer 76 and this spacer, together with an L-shaped plate 77 is secured in place by screws 78. The face of plate 77 extends upwardly in front of the upper distance piece 14 as indicated at 79 and to the right as indicated at 80. The plate 77 also supports the dog lifter 36, which in the position shown in Figures 7 and 7a, acts on the pin 35 on dog 34 to position the dog out of the path of the link 23 so that the clerk's key CK may be turned backward. The plate 77 has a rearwardly bent flange 82 above the level of the cover plate 17. The rear edge of the flange 82 has a cam surface 83 which slopes to the right and rearwardly to form a door closing cam. The plate 77 has two guide pins 84 for a pull carriage lock release in the form of a vertical strap 85 whose lower end 85a is under the latch 69 and whose upper end 85b is accessible when the upper cover C' of the housing is open. The plate 77 also carries rack pawl 86 fixedly secured to pivot post 86'. It is under the control of a spring 87 and cooperably with a rack 88 carried by the distance piece 14 to insure completion of leftward stroke after the pawl is moved far enough to engage the rack.

In order to insure that the deposit goes down into the cage or retainer formed by the cage halves 50 and 51, the pull carriage Figures 7, 8, 14, 15, 16 and 23 carries a deflector 90 in the form of a sheet metal member secured to the back of the pull carriage and disposed below and in front of the deposit opening 40 in the top plate 17.

On the cutter carriage the rear plate 63 has a horizontal rearwardly extending platform 91 which carries on its upper face the printing or embossing mechanism and the cutting mechanism. It also carries the ejector mechanism. The printing and cutting mechanism are supported on a horizontal cutter pivot plate 92 secured in place by a vertical stud 93 and having its angular movement limited by adjustable eccentric stops 94, 95 as shown in Figures 14, 15 and 16 respectively. It is held in one of the other of these positions by a spring 96 secured to the front plate 62 of cutter carriage by screws 96' and adapted to enter notches 92a or 92b respectively. The plate 92 fixedly carries a shaft 97 to the rear of the pivot 93, as shown more clearly in Figure 22. This shaft loosely carries hub 98 provided with a circular cutting knife 99 secured to it by screws 99'. The shaft 97 also carries a lower plate 100 provided with upwardly extending studs 100a and 100b. These act as distance pieces to support an upper plate 101 which is fastened in position by screws 101a and 101b, the latter extending upwardly as indicated in Figures 22 and 25. The plate 101 is held in place by a collar 102. The spacer 100a supports an inking or embossing roller 103. The plates 100 and 101 span the cutter 99 and the printing roller 103, as will be obvious from the drawing. When the collar 102 and screws 101a and 101b are removed, the cutting knife and printing roller may be removed and replaced.

The pivot stud 93 on which the cutter pivot plate 92 is supported extends above this plate as indicated in Figure 22 and loosely carries an inking roller arm 104 provided with a stud 105 which supports an inking roller 106. The inking roller is held against the printing roller and the printing roller carriage biased in a clockwise direction against an adjustable stop 107' by a coiled spring 107.

When the cutter carriage mechanism is in the right or home position of Figs. 7, 14, etc., the longer screw 101b on the printing roller frame is behind a cutting and printing roller bracket cam in the form of a strap 108 which holds the printing roller and inking roller forward in front of the printing plane, but ready for release at the proper time.

The rear platform portion 91 of the cutter carriage mechanism supports underneath it and at the rear a cutting carriage locking lever 109 pivoted at 110 and biased counterclockwise by a spring 111 connected to a pin 112 which passes through a hole 113 in the plate 91. The link has an upwardly extending pin 114 at the right and a pin 115 at the left. This pin is received in a slot 116' of a feeler finger 116 pivoted at 117 and having a nose 116a below the level of the lower pressure plate and to the left of the plate 92. When the cutter carriage is in the normal position as shown in Figs. 14 and 17, the pin or stud 114 at the righthand end of lever 109 is held against the edge of a bracket plate 119 carried by the upper rear distance piece 15 by the spring 111 and the nose 116a of the nose of the feeler finger is held forward.

The ejector

The upper platform portion 91 of the rear cutter carriage plate 63 extends to the left as indicated at 120 and carries a depending bearing member 121. The cutter carriage back plate 63 also carries a downwardly extending strap 122 to which is secured a horizontal plate 123 having a bearing hole 124 in alignment with the bearing 121 (see Figs. 8 and 21). The bearings 121 and 124 support a vertical square rod or shaft 125 which carries four ejector fingers 126a, 126b, 126c and 126d, spacers 127a, 127b and 127c, and an actuating arm 128. The shaft carried parts are held in place between nuts 129. This arm is connected by spring 130 with the supporting strap 122. The engagement of the arm 128 with the plate 123 holds the ejector fingers at right angles to the front of the machine. When the parts are in the idle position the fingers extend across the cage to the right of the deposit guide as indicated in Figs. 7 and 14, and form a right wall for the deposit receiving chamber.

The operation of the carriages

If, as above described, it is assumed that the machine has been unlocked by the clerk's key CK and a deposit package has been hung on the pins D', D', as in Figure 23, the machine is then ready for operation. The operator then grasps the grip or pull knob G and moves it quickly to the left as far as it can go. During this leftward movement of the pull knob, the cutter carriage 60 is carried along with the pull carriage 61 and during the initial movement the pin 100b which held the printing roller retracted, moves along the sloping surface 108a of the strap 108 and this allows the spring 107 to shift the printing roller to bring it into position just to the right of the ticket T. The inking roller follows. During this initial movement the pin 114 on the cutter carriage locking lever 109 has been carried along the surface of the plate 119 and the nose 116a of the feeler finger 116 has been brought far enough to ride onto the ticket T (see Fig. 18) thereby holding the lever 109 in the position shown. The rack pawl 86 is also brought toward the rack 88 and the dog retractor 36 carried by the pull carriage has moved farther to the left as indicated in Fig. 7b.

Until the rack pawl 86 has engaged with the rack 88 it is possible to return the carriages to the home position and remove the clerk's key, but as soon as the rack pawl has passed by the first tooth of the rack, it is impossible for the operator to effect backward movement of the carriage or regain possession of the key, for by this time the locking dog 34 has, as shown in Fig. 7b, dropped in a position to hold the link 23 down as well as the lever 25 in a normal open position.

It being assumed that the ticket T is in place and the nose 116a of the feeler 116 is riding on the ticket T, as shown in Fig. 18, the machine is in condition for the printing, cutting and the ejecting operations.

As the cutter carriage 60 moves to the left to pass the ticket T, it passes through the position indicated in Fig. 15. The printing roller 103 is yieldingly held against the ticket so as to make an impression on the ticket. If embossing is desired, an embossing roller and stronger spring would be used. The printing roller is partly above and partly below the level of the cutter 99 so makes part of the printed impression above the line of severance and part below. The cutter 99 engages the ticket to the right of the printing line after it has been printed and in cooperation with the groove formed at 47', 48' between the pressure plates 47 and 48, severs or cuts the ticket so that the part below the severing line can drop while the stubs are retained by the pins D', D'.

During the initial part of the movement of the cutter carriage the ejector fingers 126a–d inclusive are brought against the righthand edge of the ticket as it hangs down in the cage. This causes the fingers to swing clockwise to the position indicated in Figs. 15 and 26 or to a more forward position, depending upon the thickness of the package in the deposit. There is sufficient flexibility in the spring 130 to permit the fingers 126a–d to swing until they engage the ends of the slots 50a–d in the front wall 50 of the cage.

During the early portion of the leftward movement of the pull carriage the closing of the top door 44 is effected by engagement of the door closing cam 83 on the rearwardly extending flange 82 of the plate 77 with a pawl 135 pivoted at 136 on a door closing lever 137 and biased clockwise by a spring 138. The parts are first moved from the dotted line position of Figure 9 back to the full line position of Figure 11 where the door edge 46 is spaced from the latch end 37 of the pawl 30 so that latch 37 snaps up in front of it. After flange 82 passes pawl 135 the door moves forward against the latch 37 where it remains until again opened by the clerk's key.

When the door 44 has been pulled open by the springs 45 as above described, the parts 135 to 138 inclusive are in the dot and dash line position of Fig. 9 and by the time the cam 83 has shifted to position shown in Fig. 11, the door 44 has been closed so that the left end 37 of the door locking lever 30 is able to pass up in front of the door 44 and hold the door closed. Further movement of the pull carriage to the left carries the flange 82 to the left of pawl 135 so that the springs 45 bring the door back against the end 37 of the lever 30.

It will thus be seen that during the early part of the movement of the pull carriage the door has been pushed closed and latched closed. This pushes back the ticket and insures that it is in the proper position on the pins and against the pressure plates.

As the cutter carriage moves further to the left from the position shown in Fig. 15, the position shown for example in Fig. 16, the fingers 126a–d pass beyond the ticket and are brought back to the normal position by the spring 130.

After completion of the printing and cutting, the printing and cutting mechanism moves to the left and the nose of the feeler finger 116 rides over onto the extension 57 so that the feeler finger is held in the same alignment.

As the pull carriage 61 brings the cutter carriage 60 toward the extreme left position, a block 131 extending upwardly from the rocking plate 92 is brought against an adjustable screw 132 carried from the upper front distance piece 14 by a bracket 133. This causes the rocking plate 92 to be swung counterclockwise about pivot 93 to the angular position indicated in Fig. 16 where it is held by the spring 96 entering the notch 92a. This action effects a swinging of the plate 92 so that the cutter carrying shaft 97 is now nearer the front of the machine than it was when the rocking plate 92 was in the position of Figs. 14 to 15. This movement is sufficient to bring the cutter 99 in front of the ticket so that on the return movement to be described, the cutter does not engage the pressure plates or the ticket.

The extreme left position of the pull carriage is illustrated in Fig. 8 where it will be seen that the left end 69a of the latch 69 is brought against the bar 18 so as to swing the latch from the normal horizontal position of Fig. 7 to a raised position as in Fig. 8. This releases the pin 72 on the cutter carriage from the pull carriage. The cutter carriage is then moved to the right by a cord 140 wound around a winding drum 141 similar to that used for the carriage return of a typewriter.

Before the cutter carriage reaches the extreme right position the other side of the block 131 is brought against adjustable screw 142 carried by the bracket 27' and this brings about clockwise movement of the rocking plate 92 so that the cutter 99 is again in the rear position. When the pin 101b engages the cam 108a, the printing roller is moved forwardly. A spring bumper 143 is provided to stop the carriage in its extreme position.

During return of the cutter carriage the nose 116a of the feeler finger passes under pressure plate 48 until the pin 114 on lever 109 strikes the cam portion 119a of bracket 119. During the return movement, the pawl 135 on the door closing lever yields to allow the flange 82 to pass by.

The pull carriage is returned manually by merely moving the pull knob back to the right. This causes the latch 69 to lower and be in position to engage the pin 72 on the cutter carriage 60 so that the two carriages are again secured together for the next manipulation. As the pull carriage comes back to its extreme right position, the extension 36 carried by it engages the pin 35 of the retaining or locking dog 34 and pushes this dog out of position so that the clerk's key CK may now be removed.

If the clerk should attempt to operate the machine without having a package in it or with only the stubs of a ticket hung on the studs D', D', the machine will be automatically locked against any further manipulations. Should the nose of the feeler finger not be held out by the ticket, the spring 111 will press the stud 114 on lever 109 against the edge of bracket plate 119 and the stud will enter into a notch 119b as shown in Fig. 19. This operation takes place after the rack pawl 86 has engaged the rack so that the machine is now locked against movement in either direction and the clerk's key is captured.

In order to restore the machine to operable condition an authorized person with key for the cover housing lock must open the top of the housing which allows access to the top of the machine. Lifting up on the vertical strap 85 releases the latch 69 from pin 72 of the cutter carriage so that the cutter carriage may be returned by the pull cord 140. The pull carriage can then be shifted left and right to relatch it to the cutter carriage, or one can push the pin 114 out of the notch 119b whereby the pull carriage can be manipulated as though a package were present.

*The machine of Figures 27–34, inclusive*

This machine is in general the same as the machine of Figures 6a–26, inclusive, and corresponding reference characters indicate like parts. As shown, this machine has a modified feeler lockout arrangement according to which the non-shifting of the ejector fingers, when no deposit package is in place, is utilized. It also has the clerk's lock carried by the pull carriage. These modifications are independent of one another and therefore either may be employed without the other.

*The pull carriage supported clerk's lock*

The pull carriage 61 has the plates 65 and 66 as before, the latter extending upwardly as indicated at 74 and provided with a block 75 to which is secured the L-shaped plate 77 by screws 78. This block 75 carries the clerk's lock 150 provided with a lock arm 150a normally up in the dotted line position of Figure 33 and movable down to the full line position when the clerk's key CK is turned to have its handle horizontal. When the arm 150a is up, it engages a stop bracket 151 carried by distance piece 14. When the clerk's key CK is horizontal, it can slide through a narrow slot 152, Fig. 28a, in the housing which will not accept the key when vertical.

Turning the lock arm 150a clockwise brings it against a gravity biased pawl 153 pivoted at 153a on a lever 154 and lifts the right-hand end of this lever. This lever is pivoted in the stud 30' and functions the same as lever 30 above discussed in detail, this reference character, encircled, is applied to the lever in Figures 33 and 34.

*The ejector finger lockout mechanism*

The cutter carriage 60 has the same front plate 62 as before and the rear plate 63 has the rearwardly extending platform 91 which supports the cutter and printing mechanism and the ejector mechanism. The cutter is indicated at 99 and the upper and lower brackets 120 and 122 and plate 123 support the vertical shaft 125 as before. This shaft carries the ejector fingers 126c, d, etc. Here the space between finger 126d and arm 128 is occupied by two spacers 127c' 127c", and a cam finger 160. The end of this finger is of diamond cross-section (Fig. 32) and has upper right and lower left cam surfaces 161 and 162.

When the ejector fingers extend directly backward, as in the extreme right-hand position or the extreme left position, or when not tilted by engagement of a deposit package, the cam finger 160 is in the full line position of Figures 27 to 31. It is much closer to the front of the machine than when the ejector fingers are swung clockwise as shown in dot and dash, or dotted lines, in Figure 30.

The lower front distance piece 12, as shown in Figure 27, carries a post 163 to the left of the ejector shaft in the home position. Near the upper end, this post has a pivot 164 for a feeler lever 165 whose lower end is biased rearwardly by a spring 166 against adjustable stop 166'. The upper end of this lever carries a tip 167 which in the normal position of Figure 28 is in front of the front face of the aforementioned latch lever 69 carried on post 68 and biased by the spring 70 to hook the two carriages together.

The lower end of the feeler lever 165 extends rearwardly as indicated at 168 and is provided with a shaft 169 on which is pivoted a short channel-shaped piece 170. This piece carries a finger 171 of diamond-shaped section (Fig. 32) and biased down by gravity. It has sloping surfaces 172 and 173.

When a package T is in the cage or package receiver, as shown in Figure 30, the ejector fingers 126d, etc. shift clockwise during the initial movement of the carriage and swing the cam-carrying member 160 as shown. This member is to the rear of the finger 171 and the tip 167 of feeler finger is out of the path of the pull carriage latch 69 so that the pull carriage passes to the left until the latch 69 is lifted to release the cutter carriage for its return movement, as before. When the pull carriage is returned, the cams 172, 161 engage and the finger 171 passes above the member 160, Figure 28.

In the absence of a package, the ejector fingers extend rearwardly as shown in full lines (Fig. 31) so that the cam-carrying member 160 moving with the ejector engages the finger 171 supported by post 163. The surfaces 173 and 162 engage and this causes the finger 171 to depress the left end of lever 165 shifting it from the dotted line position of Figure 29 to the full line position. The tip 167 is then in the path of latch lever 69 and, as shown in dotted lines, Fig. 27, the latch lever is lifted to release the pull carriage from the cutter carriage. The cutter carriage then returns to home position and the pull carriage may continue over to the left position and be returned by hand for relatching.

*The machine of Figures 35 to 44*

The machine shown in these figures has a rectangular five-sided housing 200 with hole 201 in the bottom for discharge of deposits into the safe and removable cover 202 provided with key operated lock 203 to prevent access to the interior of the housing by unauthorized persons. Near the front is shown a clerk's lock 204 which, when locked, has an arm 204' which interferes with the movement of an oscillatory operating handle 205. Near the rear is a deposit guide 206 with pins 207 similar to pins D, D' above referred to. The cover also has a depressible door 208 biased upwardly by a spring 209, and adapted to be locked against opening by the arm 204" of the clerk's lock. This door is adapted to be pressed down by the insertion of a deposit package.

The base 210 of the machine is relatively short so as to be lateral of the discharge opening and as shown employs a rectangular plate 211 carrying a U-shaped bottom frame 212 made by bending an angle to form front, rear and end portions as indicated at 212a, 212b and 212c, and welding them at the corners. At the left, as viewed from the front, are front and rear vertical angle pieces 213 and 214, welded to the bottom frame member and to the left end piece 215a of a rectangular top frame 215. This top frame is also made of angle stock as indicated at 215b, 215c and 215d. The right-hand end 215d of the top frame has two downwardly extending angle pieces 216 and 217.

Mounted (as by welding or riveting) between the upper portions of left frame pieces 213 and 214 and angles 216 and 217 at the right end are relatively heavy end plates 218 and 219, respectively. Between 214 and 217 is an upper, back bar or plate 220, and at the front is a front plate 221 secured to bottom frame part 212a, left end frame part 213, and right end plate 219 by screws 222.

At the back of the machine, between back plate 220 and the bottom frame part 212b is a vertical plate 223 held in place by screws 224 and 225. At the right of bottom frame piece 212a is a rearwardly extending bracket 226 (Figs. 37 and 42) and this bracket, together with bottom frame part 212c, supports a channel 227.

Between the bottom channel 227 and the vertical rear bar 223 is a package receiver or cage 228 of U-shape, opening to the right and slotted front, rear and at the left, as indicated at 228a, 228b, 228c. The upper front part of the package receiver 228 is stiffened by a U-strap 229 and carries a door 230 hinged at 231 to swing down and biased upwardly by a spring 232. This door has a leftwardly extending projection 233 opposite notches 234 in the rear wall of the cage.

Spaced in front of the vertical members 213 and 216 is a front guide bar 235 to provide a slot 236 for the oscillating handle or operating arm 205 pivoted at 237 to plate 221. This arm is biased to the right by a spring 238. It extends up above the cover 202 and has a grip 239 by which it can be operated by the depositor. The operations of cutting, marking, and depositing are effected when this handle is shifted to the extreme left position.

Near the front of the machine, the end plates 218 and 219 carry two horizontal carriage guides 240 and 241 in the form of shafts locked against endwise movement by screws 242. The carriage illustrated is formed of three metal blocks 243, 244 and 245, secured together by screws 245'. The block 243 carries roller bearings 246, through which pass the guide rods 240 and 241, and has a rearwardly extending flange 247. The block 244 carries a latch 248 biased forwardly by a spring 248a to be in the path of the operating handle 205 and having an oblique surface 248'. The block 245 acts as a side cover plate. When the operating handle or arm 205 is shifted to the left, it is adapted to engage the latch and shift the carriage to the left, provided it is free to move, as will be set forth below. During such leftward movements, the handle return spring 238 and carriage return spring 250 are stretched.

The rear flange or bracket 247 on the carriage fixedly carries a plate 251 having an upwardly extending stud 252 on which is rotatably carried a cutting knife 253 and two embossing rollers 254, 254', one above and one below the knife 253 and adapted each to emboss one-half of an identification mark, such as the name of the store. The embossing rollers have serrated flanges 255, 255' to engage the deposit package and rotate the cutting and embossing roller assembly.

The lower face of the carriage block 243 carries a rearwardly extending plate 260 and this plate supports a downwardly extending rectangular frame 261 in which is mounted a vertical shaft 262 carrying ejector fingers 263 which extend rearwardly through the slots or notches 228a, b, c, of the package receiving cage 228. The shaft carries an arm 264 having a nose 265 engageable with the frame 261 (Fig. 42) to provide a stop, and is biased against the stop by a spring 266 so that the fingers normally extend rearwardly as indicated in Figures 38 and 39, and in the full lines of Figure 42. They can pivot as indicated in the dotted lines of Figure 42. The lower end 267 of the shaft 261 is in the channel 227 which forms a guide for the shaft.

The upper rear plate 220, carries four guide pins 270 secured at the front ends to a pressure plate 271 directly below the package guide 206 and urged rearwardly by springs 272. The rear face of the pressure plate has vertical grooves 273 (Figs. 38, 39). Between the pressure plate and the back plate 220 is a sliding plate 274, slotted at 274' to accommodate the guide pins 270 and provided with ridges 275 normally lateral of the recesses so as to force the pressure plate 271 forwardly, but movable to bring the ridges opposite the grooves so that the springs may retract the pressure plate (Fig. 39). The left end of the sliding plate 274 carries a forwardly extending finger flange 276 with a finger 277 normally above and out of engagement with the door depressor finger 230a, and the right end carries a forwardly extending finger 278 to the right of the cutter carrying plate 251.

The cutter carriage supporting plate 251 is provided with a downwardly extending pin 280 (Figs. 37 and 44) which may strike the right edge of door 230 so that when the door is up, as in the absence of a package, the handle cannot be operated.

The machine is held in the housing by screws 281 threaded into the plates 218, 220 and 221.

*The operation of the machine of Figures 35 to 44*

The machine of Figures 35 to 44 is designed to operate with the same type of deposit package as before discussed. The clerk, after preparing to make the deposit, lowers the deposit package through the cover-carried door 208 and past the lower door 230 so that the package extends across the pressure plate 271 and down into the receiver as shown in Figures 39, 41, 42. It may rest on the bottom plate and the top of the ticket may be placed on the pins 207 in the package guide. This insertion of the package pushes down the lower door 230 so that the leftward movement of the arm and cutter carriage is not impeded.

When the cutter carriage is brought far enough to cause the serrated edges 255, 255' of embossing rollers 254, 254' to engage the upper part of the package, rotary motion is imparted, the indicia placed on the deposit form or ticket and the same severed so that the deposit package is freed from the pins 207. At the same time the ejector fingers 263 have been swung forwardly so as to pass by the hanging package and have snapped back to position as shown at the left of Figure 42.

Near the extreme left position of the cutter carriage, it is brought against the left flange 276 of sliding plate 274, shifting this plate to the left and bringing the finger 277 against the door depressor 230a so that door 230 is pushed down freeing the severed package. At the same time, the ridges 275 on the sliding plate are brought opposite the grooves 273 in the pressure plate 271 so that springs 271 retract the pressure plate. When the latch 248 in the carriage is brought against a stationary cam 282 at the left of the machine this cam presses latch 248 to the rear so that the carriage is returned to the right, or home position, by the carriage return spring 250, the door 230 is held down by engagement of parts 276 and 230a so that pin 280 clears the door. The retracted pressure plate is also out of the path of the cutting and marking rollers.

When the cutter carriage returns to home position, the plate 251 engages the right finger 278 on the sliding plate 274 and brings it back to the right-hand position, restoring the pressure plate 271 and releasing the door 230. The return of the cutter carriage also brings the ejector fingers 263 against the left edge of the package and ejects it out of the package receiver so that it may drop into the safe. The cutter carriage is held against a rubber bumper indicated at 283. The handle 205 is returned when released by the operator. The clerk can then remove the stubs as before.

Should one attempt to secure embossed stubs without making a deposit, the depression of the upper door 208 (to give access to the lower door so that it can be lowered below stop pin 280) brings the door 208 into the path of the cutter carriage-carried parts so that they cannot be moved across the ticket.

*The machine of Figures 46–52*

The machine illustrated in Figures 45–52 is adapted to be received in a 5-sided box or housing diagrammatically shown at 300 and provided with hole 301 for the deposits to drop through.

The machine has a flat base plate 302 having at the front a vertical plate 303 secured in place by screws 304 and at the rear a deposit receiver 305 of D-shaped cross section shown welded to it and provided with a series of horizontal slots 306. Welded to the top of the receiver at the front is a spacer plate 307 and welded to this is a guide plate or bed 308. A top frame member 309 having a rectangular opening 310 (for a cover to be described) is welded to the righthand end of the guide plate 308 by a strap 311 and to the left upper end of the deposit receiver by a strap 312. Welded to the receiver at the top rear is a horizontal bar 313 with downwardly opening notches 314, and an extension 315 to the right.

The lower portion of the plate 303 carries at 316 a pivot for an upwardly extending operating arm 317 having a handle 318 external of the housing 300. The upper portion of plate 303 carries at 319 a pivot for a link 320 which extends downwardly and carries a stud 321 which passes through a slot 321' in the arm 317. The lower end of the link 320 has a rearwardly extending stud 322 and the upper part of the operating arm has a rearwardly extending stud 323. The studs 322 and 323 enter slots 324 and 325 in a vertical bar 326 in front of the package receiver 305 and whose lower end rides back and forth on the bottom plate 302. These parts form a parallel link motion so that the bar 326 moves back and forth in a vertical position as the operating arm is swung back and forth about its pivot. The vertical bar 326 carries a vertical shaft 327 on which are pivoted ejector fingers 328 biased against fixed stops 329 by spring 330. These fingers are movable in the slots 306 of the receiver.

The cover 331 is in the form of a flat plate adapted to fit into the opening 310 in the top frame and be secured in place. It has an entrance door 332 biased upwardly by a spring 333 and adapted to be depressed by a deposit as indicated in Figure 48.

The spacer plate 307 also carries a hinged door 334 biased upwardly by a spring 335 and having extension 336 which enters the notches 314 in the bar 313. This door is also adapted to be depressed by a deposit as shown in dotted lines in Figure 48 and is brought to a sloping position when a deposit is in place, as indicated in Figures 48 and 50.

The guide plate 308 has at the rear a forwardly opening groove 340 into which extends a flange 341 at the rear of a cutter carrying plate 342. The front of this plate has a groove 343 into which a flange 344 extending down from the cover 331 so that the plate 342 is guided for reciprocation back and forth on plate 308. It is provided with a slot 345 to receive a finger 346 carried by the operating arm 317. When the operating arm is in the right position, full lines of Figs. 45, 46 and 50, the cutter carriage 342 is to the right of the doors 332 and 334.

The cutter carriage 342 is provided with two slots 347 through which extend pins 348. The lower ends 349 of these pins are received in a slot 350 in the guide plate 308. Their upper ends are secured to a bracket 351 extending rearwardly and removably supporting a shearing knife 352. When the parts are in the position of Figure 50, the bracket 351 and knife 352 are to the rear and the knife extends well beyond the extension 315 and the depending flange 353 on the cover.

The cutter carriage 342 also carries a slotted frame piece 354 in which are pivoted an inkling roller 355 and a printing roller 356. These rollers are urged rearwardly by spring 357. When in the idle position the printing roller bears on extension 315. Should one attempt to shift the operating arm out of the full line position of Figures 45 and 46, the cutter carriage will be stopped by engagement of the left part of the printing roller carrying frame 354 with a lug 358 extending upwardly from the lower door 334. The presence of the deposit package, as shown in Figures 48 and 50, insures depression of this lug below the path of the carriage carried parts and permits the carriage 342 to be shifted to the left.

During the movement of the carriage 342 to the left the printing roller rides across the face of the deposit ticket both above and below the level of the cutting knife 352 and then runs on to the cover carried flange 353. The knife moves to the left and owing to the oblique portion 359 of the slot 350, the pins 348 change the angle of the cutter and shift it forwardly, as clear from Figure 51. During the cutting movement, the ejector fingers have passed by the deposit and are in a position to eject it from the receiver on the return movement, as before described. The lug 358 has a left stopping surface 360 so that the lower door is depressed as the carriage returns.

This machine may use a deposit ticket such as shown in which case the operator holds onto the upper end or the upper end may be made wider than the door length.

While the above machines are more particularly devised for use by clerks in department stores, it will be understood that they may also be used for issuing receipts to outside salesmen and collectors, or to the general public for deposits made in payment of utility bills or the making of deposits in banks without requiring a teller's receipt.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A machine for use with a deposit package having two portions, the upper one adapted to become a receipt and the other, when separated from the receipt portion, to be accepted as a deposit, said machine having a discharge passageway for the gravity discharge of accepted deposits, a vertically disposed, upwardly opening, stationary package receiver having means engaging the receipt portion to support the deposit package in pendent position in the receiver at an elevation above that of the discharge passageway, package intercepting means normally preventing the uninterrupted passage of the deposit package through the receiver and the discharge passageway, a package serving means, including a shear plate behind the package and below the supporting means, and a cooperative cutter normally lateral of the package and movable transversely of the package and shear plate to thereby separate the two portions so that the lower one is released for support on the package intercepting means while the receipt portion is retained, a package marking means also movable transversely of the package and of a height to mark the package both above and below the line of severance and provide indicia on both the receipt portion and the deposit portion, means effective after severance to bring about gravity discharge of the severed package through the discharge passageway, and means to thereafter restore the aforesaid parts to normal position for acceptance of another deposit package.

2. A machine such as claimed in claim 1, having means which confine the carrying out of the aforesaid operation to the order stated, with the marking operation taking place during a portion of the severing operation.

3. A machine such as claimed in claim 1, having a key operated lock which only when unlocked permits initiation of the marking and severing operations.

4. A machine such as claimed in claim 1, wherein the package marking means is normally between the cutter and the deposit package and moves in advance of the cutter.

5. A machine such as claimed in claim 1, including means whereby the marking means and severing cutter, after operating on the deposit package, are returned to the original position through a path which keeps them out of marking and severing relation with the receipt.

6. A machine such as claimed in claim 1, having means to guide the marking means and the severing cutter for horizontal movement.

7. A machine such as claimed in claim 1, having means to guide the marking means and the severing cutter for horizontal reciprocation.

8. A machine such as claimed in claim 7, having means to hold the shear plate and cutter in cooperative position during the severing operation and for moving one of the same away from the deposit package after severing so that the cutter may freely pass back.

9. A machine such as claimed in claim 8, wherein the shear plate is stationary and the said means shifts the cutter away from the shear plate for the return stroke.

10. A machine such as claimed in claim 1, having means to guide the marking means and severing cutter for horizontal reciprocation across the face of the deposit package and means to shift both the cutter and the marking means away from the adjacent face thereof during the return stroke.

11. A machine such as claimed in claim 1, wherein the package intercepting means is stationary, the discharge opening is lateral of the package receiver, and the means for bringing about gravity discharge includes horizontally movable ejector fingers which shift the deposit across the intercepting means.

12. A machine such as claimed in claim 1, having a door above the receipt engaging means and normally locked closed, a key operated lock which when unlocked unlocks the door so that it may be opened, and then permits initiation of the marking and severing operations, the machine including means for closing the door before the severing is completed.

13. A machine for use with a deposit package having two portions, the upper one adapted to become a receipt and the other, when separated from the receipt portion, to be accepted as a deposit, said machine having a discharge passageway for the gravity discharge of accepted deposits, a vertically disposed, upwardly opening, stationary package receiver having means engaging the receipt portion to support the deposit package in pendent position in the receiver at an elevation above that of the discharge passageway and disposed laterally thereof, the receiver having a bottom which prevents the uninterrupted passage of the deposit package through the receiver and the discharge passageway, a package severing cutter normally lateral of the package and movable transversely of the package below the supporting means to thereby separate the two portions so that the lower one is released for support on the package intercepting means while the receipt portion is retained, a package marking means also movable transversely of the package, and of a height to mark the package both above and below the line of severance and provide indicia on both the receipt portion and the deposit portion, means effective after severance to shift the severed package laterally so that it may pass through the discharge passageway, and means to thereafter restore the aforesaid parts to normal position for insertion of another deposit package.

14. A machine such as claimed in claim 13, wherein the package marking means is normally between the cutter and the deposit package and moves in advance of the cutter.

15. A machine such as claimed in claim 13, having means to guide the marking means and the severing cutter for horizontal movement.

16. A machine such as claimed in claim 13, having means to guide the marking means and the severing cutter for horizontal reciprocation.

17. A machine for use with a deposit package having two portions, the upper one adapted to become a receipt and the other, when separated from the receipt portion, to be accepted as a deposit, said machine having a vertically disposed, upwardly opening, stationary package receiver having means engaging the receipt portion to support the deposit package in pendent position in the receiver, package intercepting means under the supporting means, a pressure plate behind the suspended package and having a shearing edge extending transversely of the package, a movable cutter carriage in front of the package and carrying a rotatable cutter driven by the engagement with the package and cooperative with the shearing edge of the pressure plate to sever the deposit package when moved across the same so that the lower one is released for support on the package intercepting means while the receipt portion is retained, a rotatable package marking means carried by the cutter carriage, normally between the cutter and the deposit package, movable transversely of the package in advance of the cutter and similarly driven, the marking means being of a height to mark the package both above and below the line of severance and provide indicia on both the receipt portion and the deposit portion, means effective after severance to laterally shift the severed package beyond the supporting means so that it may fall free, and means to thereafter restore the severing and marking means to normal position for insertion of another deposit package.

18. A machine such as claimed in claim 17, wherein the cutter carriage is supported on horizontal guides for reciprocation back and forth.

19. A machine such as claimed in claim 17, having a manual operator to shift the carriage in the cutting and marking direction, a latch automatically released at the end of the stroke, and a carriage return spring.

20. A machine for use with a deposit package having two portions, the upper one adapted to become a receipt and the other, when separated from the receipt portion, to be accepted as a deposit, said machine having a package holder engageable with the receipt portion only so that the remainder of the package hangs down, a shear plate back of the package, a package receiver having front and rear walls between which the lower portion of the package extends and a bottom on which the said portion stands erect after severance, a manually movable carriage guided for back and forth reciprocation in front of the package, and above the receiver, carriage-carried ejector fingers pivotally mounted for movement about a vertical axis in front of the receiver and spring biased to a position to form when the carriage is in one extreme position another receiver wall, the front wall of the receiver being horizontally slotted so that the fingers can move crosswise of the receiver, the fingers being yieldable so that when moving across the package they may swing aside and pass by, a package carried cutter lateral of the package when the carriage is in said position and cooperable with the shear plate whereby the lower portion of the package may be severed from the receipt portion as the cutter is moved from said position across the package, and a carriage-carried package marking device which bears on the package both above and below the line of severance to plate indicia on both portions before the lower one drops free, the ejector fingers on the return movement of the carriage pushing the severed package laterally beyond the bottom of the receiver.

21. A machine such as claimed in claim 20, wherein the shear plate is stationary and having means to shift the cutter and marking device forwardly of the cutting and marking position during the return movement of the carriage and means for restoring them to cutting and marking position for the next operation.

22. A machine such as claimed in claim 20, wherein the shear plate is biased rearwardly and having cam means to hold the plate forward during the cutting and marking stroke.

23. A machine such as claimed in claim 20, wherein the cutter is mounted as a horizontally rockable plate which in one position places the cutter in cutting relation with the shear plate and in the other position spaces it forwardly of the shear plate, and having means to shift it to the first mentioned position prior to the cutting stroke and to the other position for the return stroke.

24. A machine such as claimed in claim 23, wherein the marking device is also carried on the rockable plate and is similarly shifted.

25. For use with a deposit package having two portions, the upper one adapted to become a receipt, and the other when separated from the receipt portion, to be accepted as a deposit, and in combination, a safe having a hole in the top, a deposit accepting machine mounted on top of the safe and about said hole, said machine having a deposit chute provided with a bottom which prevents the direct passage of the package or the deposit portion thereof through the hole into the safe, means engageable with the receipt portion to support the entire package pendant, severing means for separating the two portions, marking means for placing indicia on both portions before severance, and means for relatively shifting the deposit portion and the chute bottom to free the deposit portion from gravity support so that it falls through the hole into the safe.

26. The combination of claim 25, wherein the chute is lateral of the hole in the safe and the shifting means acts on the severed deposit to shift it laterally.

27. The combination of claim 26 and wherein the severing and marking means and the shifting means are secured together and guided for bodily horizontal movement, the shifting means being yieldable to pass by the package during the severing and marking stroke.

28. The combination of claim 27 having means to render the severing and marking means non-functioning on the return stroke.

29. A depositing machine having a vertical receiver adapted to receive a deposit and having a horizontally slotted front wall, a rear wall, a connecting end wall and open at the other end, a horizontally reciprocable ejector including fingers extending through the slotted wall, pivotally mounted for movement about a vertical axis and biased across the receiver, the fingers in one of the extreme horizontal positions of the ejector closing the other end of the receiver to form a fourth wall, the fingers being yieldable to ride over the deposit while traversing it and to return to normal angular position after passing by the deposit, so that upon return of the ejector to the first extreme position the deposit is ejected laterally from the receiver and the receiver conditioned for another deposit, a deposit support above the receiver and from which the deposit is adapted to extend downwardly into the receiver, a cutter carrier also horizontally reciprocable concurrently with the ejector and having cutter means below the deposit support for severing the deposit when the cutter means is moved from the first extreme position to the other so that the lower portion of the deposit is freed for ejection, a common operator for the ejector and the cutter carrier, and means, acting in response to the absence of a deposit to prevent actuation of the cutter or of the ejector by the common operator in the first mentioned direction.

30. A depositing machine such as claimed in claim 29, having a horizontally reciprocable marking device, movable with the cutter for marking the deposit both above and below the line of severance.

31. A depositing machine such as claimed in claim 29, wherein the package absence responsive means includes a feeler finger below the cutter and movable with the cutter, a spring urging the finger against the deposit and a carrier-carried latch held open by the finger.

32. A depositing machine such as claimed in claim 29, wherein the deposit package absence responsive means includes the ejector fingers and a latch released thereby.

33. A depositing machine such as claimed in claim 29, wherein the deposit absence responsive means includes a door spring biased upwardly to be in the path of the cutter carrier and held depressed by the deposit so that the cutter carrier may pass by.

34. A depositing machine such as claimed in claim 29, wherein the common operator is spring biased toward the first position and having an actuating device latched thereto for actuating the operator to the other position.

35. A depositing machine comprising a fixed frame including horizontal carriage guides, a fixed upwardly and laterally opening deposit receiver disposed behind the guides and having a bottom, fixed means to support a deposit pendent in the receiver, a shear plate below the deposit supporting means, a cutter carriage reciprocably carried by the guides and spring biased to an extreme position of rest, a pull carriage also carried by the guides on the side thereof remote from said position, latch means interconnecting the two carriages when in said position so that the cutter carriage may be pulled to stress the return spring, a latch opening means effective at the end of the pull stroke to release the cutter carriage for return by the spring, a cutter carried by the cutter carriage and cooperable with the shear plate during the pull stroke to sever the deposit so that the upper portion is retained on the support and the lower portion is supported by the bottom of the receiver, a cutter-carriage-supported ejector having ejector fingers spring biased about a vertical axis to a rear position and normally closing the open side of the deposit receiver, the fingers during the pull stroke being movable across the deposit in the receiver and swung about the vertical axis and thereafter movable beyond the deposit where they return to the rear position, and in said rear position acting on the return stroke to eject the severed package from the receiver means acting on the cutter after it passes by the deposit for moving it forwardly and holding it in forward position to clear the deposit during the return stroke, and means for restoring the cutter to its normal cutting alignment at the end of the return stroke.

36. A depositing machine such as claimed in claim 35, wherein the cutter is rotatably mounted on a plate pivoted to the cutter carriage for oscillation about a vertical axis and having carriage-carried stops which limit the movement of the latter mentioned plate.

37. A depositing machine such as claimed in claim 36, having a printing roller carried on the last mentioned plate and positioned thereby in printing relation with the deposit during the pull stroke and spaced in front of the printing position during the return stroke.

38. A depositing machine such as claimed in claim 35, having a stationary rack and a pull-carriage-supported pawl engageable with the rack after a predetermined movement in the pull stroke and locking the pull carriage against return movement unless the pull carriage is pulled beyond the rack, to free the pawl.

39. A depositing machine such as claimed in claim 38, having deposit feeler mechanism responsive to the absence of a deposit in the receiver for locking the cutter carriage against movement and timed to effect such locking after the rack and pawl have engaged so that both carriages are locked against movement in either direction.

40. A depositing machine such as claimed in claim 39, having means to release the carriage coupling latch so that the cutter carriage may return and the pull carriage may be moved to free the rack pawl and be returned for relatching to the cutter carriage.

41. A depositing machine such as claimed in claim 35, including means effective upon an attempt to shift the carriages in the pull direction in the absence of a deposit in the receiver for preventing traverse of the deposit by the cutter.

42. A depositing machine such as claimed in claim 41, wherein the traverse preventing mechanism includes means stopping movement of both carriages in either direction.

43. A depositing machine such as claimed in claim 41, wherein the traverse preventing mechanism includes means for releasing the carriage connecting latch.

44. A depositing machine such as claimed in claim 35, wherein the cutter carriage supports two levers connected together and spring biased so that their remote ends are urged rearwardly, and so disposed that the end of one is in advance of the cutter and is movable across the face of the deposit during the pull stroke, the frame having a member against which the free end of the other lever bears when the cutter carriage is in the position of rest and until it is moved far enough to dispose the end of the first lever on the deposit, said frame carrying member having a notch into which the said end is forced by the biasing spring in the absence of a deposit to stop movement of the cutter carriage.

45. A depositing machine comprising a housing having side walls and a bottom provided with a discharge opening, a housing cover having an opening to admit the downward insertion of a deposit and means to hold the deposit suspended, a receiver below the opening in the cover and into which the deposit extends, a normally closed door across the cover opening, means enclosed in the housing and movable from an idle position to sever the deposit intermediate its length so that the upper part is held supported by the cover and the lower part is freed, means intercepting the freed portion of the deposit so that it remains in the receiver after severance, means enclosed in the housing for relatively shifting the severed deposit and the intercepting means and for disposing the severed deposit in position to fall through the opening in the bottom of the housing, a common operator for both the severing and shifting means, means accessible externally of the housing for actuating the common operator, and a key operated lock which holds the door closed and prevents movement of the severing and shifting means out of the idle position to prevent unauthorized operation thereof or the insertion of objects through the cover opening.

46. A depositing machine such as claimed in claim 45, having means to prevent removal of the key after initiation of the severing operation and prior to the completion of the shifting operation.

47. A depositing machine such as claimed in claim 45, wherein the cover is hingedly secured to the housing and carries the deposit holding means, the door is supported for back and forth movement below the cover and biased open and having a key releasable latch for the door.

48. A depositing machine such as claimed in claim 47, having a door closer operable by the said common operator to shift the door to closed position.

49. A depositing machine such as claimed in claim 45, having means to prevent retrograde movement of the common operator until after the severing operation has been completed.

50. A depositing machine comprising a housing having side walls and a bottom provided with a discharge opening, a housing cover having an opening to admit the downward insertion of a deposit and means to hold the deposit suspended, a receiver below the opening in the cover, located laterally of the discharge opening, and into which the deposit extends, a normally closed door across the cover opening, a housing enclosed, horizontally reciprocable cutter carriage biased to idle position and carrying a cutter effective on the cutting stroke for severing the deposit intermediate its length so that the upper part is held supported by the cover and the lower part is freed, stationary means for intercepting the freed portion of the deposit so that it remains in the receiver after severance, cutter-carried ejector means effective on the return stroke for ejecting the freed portion of the deposit laterally so that it may fall through the discharge opening, a horizontally reciprocable pull carriage normally latched to the cutter carriage for pulling the carriage during the cutting stroke, a pull carriage operator extending through a slot in the housing and externally accessible, a latch releaser effective at the end of the pull stroke to disconnect the cutter carriage for return to the idle position, a key operable lock enclosed in the housing and operable by a key external of the housing, means locking the pull carriage against movement when the lock is locked and releasing it for movement when unlocked, key operable means acting when the key is shifted to unlocking position to release the door so that it opens, and means preventing retrograde movement of the pull carriage until after it has completed the cutting stroke.

51. In a depositing machine, means to hold a deposit in pendent position, a shear plate back of the deposit and adjacent the holding means, a horizontally reciprocable cutter carriage, a rotatable cutter mounted on the carriage on a vertical axis and movable back and forth across the shear plate, means effective at the end of one stroke to relatively locate the shear plate and cutter to be in shearing relation with the deposit on the subsequent stroke and effective at the end of the shearing stroke to shift one out of shearing engagement with the other on the return stroke.

52. In a depositing machine such as claimed in claim 51, wherein the last mentioned means moves the cutter while the shear plate remains fixed.

53. In a depositing machine such as claimed in claim 51, wherein the cutter path is the same in both directions of movement and the last mentioned means shifts the shear plate toward and away from the cutter.

54. In a depositing machine such as claimed in claim 51, having a marking device also mounted on the cutter carriage for movement back and forth therewith, and means rendering it effective for marking during the shearing stroke and ineffective during the return stroke.

55. In a depositing machine, means to hold a deposit in pendent position, a shear plate back of the deposit and adjacent the holding means, a horizontally reciprocable cutter carriage in front of the deposit and provided with a vertical pivot post, a cutter carrier pivoted on the post, stationary stops against which the cutter carrier is brought near the ends of the travel of the carriage to effect limited oscillation of the cutter carrier, and a rotatable cutter mounted on the cutter carrier in a position to cooperate with the shear plate on one stroke of the carriage to sever the deposit, and in response to the movement of the cutter carrier be positioned in front of the shear plate on the return stroke.

56. In a depositing machine such as claimed in claim 55, wherein the cutter carrier supports an arm carrying a printing roller disposed in advance of the cutter and spring biased rearwardly to bear against the deposit on the shearing stroke, the cutter carrier having a stop which engages the arm to retract it from the deposit on the return stroke.

57. In a depositing machine such as claimed in claim 56, having a stationary cam against which the arm is brought at the end of the return stroke to hold the printing roller retracted.

58. A depositing machine comprising a protective housing having a cover provided with externally accessible means for supporting a deposit pendent and an opening through which the deposit may be inserted, a door biased to open position, a spring biased latch for holding the door closed, a lock enclosed in the housing and operable by a key external of the housing key operated means for withdrawing the latch upon initial turning the key, enclosed cutting and printing mechanism for cutting the lower portion of the deposit from the upper portion and printing indicia on both portions, a reciprocable carriage supporting the cutting and printing mechanism, and spring biased to one extreme position, a pull carriage for actuating the first carriage against the spring bias and having a latch releasable at the end of the pull stroke to free the first carriage for return, means locking the latched carriages in the said extreme position except when the key is turned to unlocking position, means permitting a finite movement of the carriages in the absence of a deposit and thereupon stopping further movement of both carriages, means effective prior to the completion of said finite movement for preventing retrograde movement of either carriage, and means preventing removal of the key when the carriages are so positioned.

59. A depositing machine such as claimed in claim 58, wherein the means which stops movement of the carriages in the absence of a deposit includes a feeler finger displaced by engagement with a deposit and disabling the same so that when a deposit is present the pull carriage may shift the other carriage for the full stroke.

60. A depositing machine such as claimed in claim 59, wherein the means preventing removal of the key is rendered ineffective only upon the return of the pull carriage.

61. A depositing machine such as claimed in claim 58, wherein the door latch actuating means includes means for releasing the door latch when the key is completely turned, and the pull carriage has cam means to reclose the door during the initial portion of the pull stroke to prevent access to the severed portion of the deposit.

62. A depositing machine comprising a protective housing having a cover provided with externally accessible means for supporting a deposit pendent and an opening through which the deposit may be inserted, a door biased to open position, a spring biased latch for holding the door closed, a lock enclosed in the housing and operable by a key external of the housing, key operated means for withdrawing the latch upon initial turning the key, enclosed cutting and printing mechanism for cutting the lower portion of the deposit from the upper portion and printing indicia on both portions, a reciprocable carriage supporting the cutting and printing mechanism, and spring biased to one extreme position, a pull carriage for actuating the first carriage against the spring bias and having a latch releasable at the end of the pull stroke to free the first carriage for return, means locking the latched carriages in the said extreme position except when the key is turned to unlocking position, means effective after a finite movement of the pull carriage to prevent retrograde movement thereof until it has completed its stroke, and means effective to prevent removal of the key until the pull carriage is returned to latched position, the door latch actuating means including means for releasing the door latch when the key is completely turned, and the pull carriage having cam means to reclose the door during the initial portion of the pull stroke to prevent access to the severed portion of the deposit.

63. The method of depositing valuables, such as cash, checks and the like, which comprises placing the same in a deposit package having a tab by which it may be held pendent, inserting it into a receptacle so that the tab only is exposed, closing off the receptacle so that the package is no longer accessible for removal, then severing the enclosed portion of the deposit package from the exposed portion and applying identifying indicia to both portions before completing severance, discharging the severed portion from the receptacle so that in the next opening of the receptacle it is inaccessible, and removing the severed supporting tab with printed indicia as evidence of having made a deposit.

References Cited in the file of this patent

UNITED STATES PATENTS

| Number | Name | Date |
|---|---|---|
| 1,106,958 | Montgomery | Aug. 11, 1914 |
| 1,149,295 | Schweitzer | Aug. 10, 1915 |
| 1,168,548 | Quegley | Jan. 18, 1916 |
| 1,259,399 | Hipwell et al. | Mar. 2, 1918 |
| 1,506,491 | Kline | Aug. 26, 1924 |
| 1,960,175 | Stevens | May 22, 1934 |
| 2,030,313 | Murtaugh, Jr. | Feb. 11, 1936 |
| 2,572,003 | Binns et al. | Oct. 23, 1951 |